United States Patent
Matsuda et al.

(10) Patent No.: US 6,492,760 B1
(45) Date of Patent: Dec. 10, 2002

(54) ACTUATOR

(75) Inventors: Shinya Matsuda, Kyoto (JP); Takashi Matsuo, Itami (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/583,366

(22) Filed: May 31, 2000

(30) Foreign Application Priority Data

Jun. 1, 1999 (JP) .......................................... 11-153472

(51) Int. Cl.$^7$ .............................................. H01L 41/08
(52) U.S. Cl. ........................... 310/323.02; 310/323.12; 310/323.16; 310/328; 310/316.01
(58) Field of Search ........................ 310/328, 323.02, 310/323.16, 317, 319, 316.01

(56) References Cited

U.S. PATENT DOCUMENTS

| | | | |
|---|---|---|---|
| 4,613,782 A | * 9/1986 | Mori et al. | 310/323.16 |
| 4,950,135 A | * 8/1990 | Tojo et al. | 310/328 X |
| 5,132,582 A | 7/1992 | Hayashi et al. | 310/323 |
| 5,424,597 A | * 6/1995 | Gloss et al. | 310/328 |
| 5,563,465 A | * 10/1996 | Nakahara et al. | 310/328 |
| 5,616,980 A | 4/1997 | Zumeris | 310/323 |
| 5,900,691 A | * 5/1999 | Reuter | 310/328 |
| 6,066,911 A | * 5/2000 | Lindemann et al. | 310/323.02 |
| 6,201,340 B1 | * 3/2001 | Matsuda et al. | 310/328 |

FOREIGN PATENT DOCUMENTS

| | | |
|---|---|---|
| JP | 53-082286 | 7/1978 |
| JP | 62-058883 | 3/1987 |
| JP | 5-184172 | 7/1993 |

OTHER PUBLICATIONS

"Development of a Small Actuator with Three Degrees of Rotational Freedom (1$^{st}$ Report)—Motion Analysis of the Drive Unit—", K. Sasae et al., *Journal of Precision Engineering Institution*, vol. 61, No. 3, 1995, pp. 386–390.

"Manufacture and Estimation of Thin Ultrasonic Linear Motor", S. Nagatome et al., *Collection of Lecture of Precision Engineering Institution*, Spring, 1998, p. 544.

"Development of a Small Actuator with Three Degrees of Rotational Freedom (2$^{nd}$ Report)—Simulation and Experiment of a Friction Drive—", K. Sasae et al., *Journal of Precision Engineering Institution*, vol. 61, No. 4, 1995, pp. 532–536.

"Development of a Small Actuator with Three Degrees of Rotational Freedom (3$^{rd}$ Report)—Design and Experiment of a Spherical Actuator—", K. Sasae et al., *Journal of Precision Engineering Institution*, vol. 62, No. 4, 1996, pp. 599–603.

Sogo Denshi Shuppansha Japan, "Admission Into Ultrasonic Motor", Feb. 20, 1991 (4 pages).

Hideaki Oku et al, "First Report of Piezoelectric Traveling Wave Type Linear Actuator", *Collection of Lecture of Precision Engineering Institution*, Spring, 1995 (2 pages).

U.S. patent application Ser. No. 09/591,622, filed Jun. 9, 2000.

U.S. patent application Ser. No. 09/697,570, filed Oct. 26, 2000.

* cited by examiner

Primary Examiner—Mark O. Budd
(74) Attorney, Agent, or Firm—Sidley Austin Brown & Wood LLP

(57) ABSTRACT

A truss type actuator including two piezoelectric devices drives a chip member provided at a crossing point of the piezoelectric devices for moving along an elliptic or a circular trail. Only one piezoelectric device is driven for transmitting vibrations thereof to the other non-driven piezoelectric device. By selecting a frequency of driving signals, both of the piezoelectric devices are resonantly vibrated with a phase difference of 90 degrees.

20 Claims, 21 Drawing Sheets

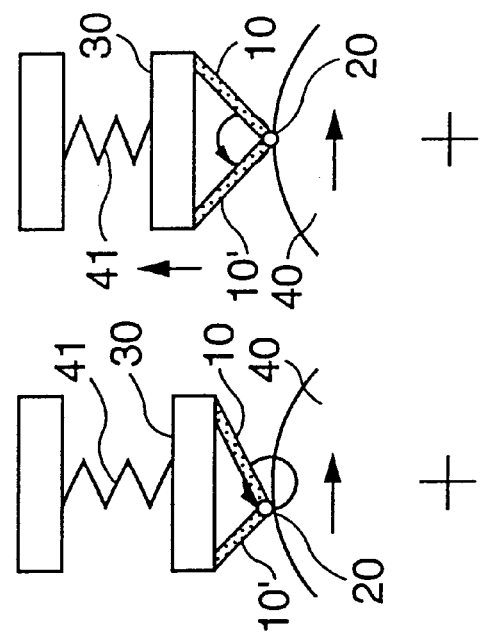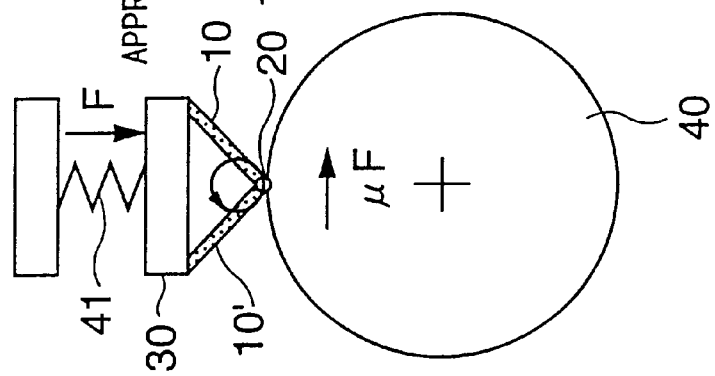

PHASE DIFFERENCE 0°

PHASE DIFFERENCE 45°

PHASE DIFFERENCE 90°

PHASE DIFFERENCE 135°

PHASE DIFFERENCE 180°

FIG.17A  FIG.17B  FIG.17C  FIG.17D  FIG.17E
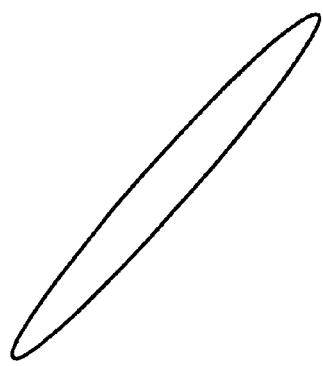
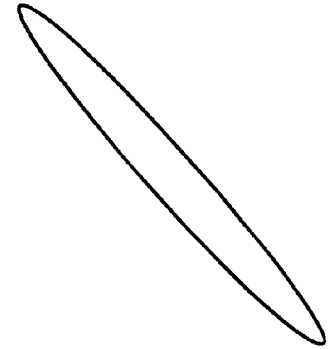

ACTUATOR

This application is based on patent application Hei.11-153472 filed in Japan, the contents of which are hereby incorporated by references.

BACKGROUND OF THE INVENTION

1. Field of the Invention

This invention relates to an actuator, such as a truss type actuator for generating an elliptic movement of a driven object by composition of displacements of a plurality of displacing devices where one displacing device is vibrated by vibrations of another displacing device.

2. Description of the Related Art

A first conventional truss type actuator is shown in "Development of a Small Actuator with Three Degrees of Rotational Freedom (1st Report)" by K. SASAE et. al., Journal of Precision Engineering Institution, Vol.61, No.3, 1995. In the first conventional truss type actuator, a chip member is provided at a crossing point of three lamination type piezoelectric devices. The piezoelectric devices are driven for moving the chip member so as to trail a spherical surface, so that a spherical driven member can be revolved in an optional direction. Since the piezoelectric devices are driven in non-resonance mode, the displacement of the piezoelectric devices are not so large and the driving efficiency of the actuator is relatively low.

A second conventional truss type actuator is shown in "Manufacture and Estimation of Thin Ultrasonic Linear Motor" by S. NAGATOME, et. al., Collection of Lecture of Precision Engineering Institution, in Spring, 1998. In the second conventional truss type actuator, a steel plate is blanked so that two displacing portions cross at right angle. Piezoelectric devices are fixed on respective displacing portions. One of the piezoelectric device is resonantly driven for colliding the peak at the crossing point of the displacing portions with a driven member obliquely. Thus, the driven member is moved in a predetermined direction. Since the piezoelectric device is driven in resonance mode, the displacement of the piezoelectric device can be made larger. The peak of the steel plate, however, collides with the driven member linearly, so that acoustic noise and vibrations of the actuator are relatively larger. Furthermore, the steel plate and the driven member are heavily worn. Still furthermore, the actuator has no mechanism for detecting the displacement of the piezoelectric device, so that it is difficult to control the moving speed of the driven member.

SUMMERY OF THE INVENTION

An object of this invention is to provide an actuator having a simple configuration and high driving efficiency, and easily be controlled.

An actuator in accordance with an aspect of this invention comprises a base member, a first displacing device held on the base member and displacing by supplying of electric power, a second displacing device held on the base member and displaceable, a compound member for compounding displacements of the first and second displacing devices and a driver for supplying electric power to the first displacing member in a manner so that the compound member moves along an elliptic or a circular trail.

The elliptic or the circular trail of the compound member is conventionally obtained by driving the first and second displacing devices, and the conventional driver has two ways of driving systems for driving the first and second displacing devices. However, the configuration of the above-mentioned actuator can realize the elliptic or the circular trail of the compound member by driving only one displacing device. Since the driver needs only one driving system, the circuit of the driver cam be simplified and the electric power consumption of the actuator can be reduced.

BRIEF DESCRIPTION OF THE DRAWINGS

FIGS. 6A to 6E are schematic views for showing rotation mechanism of the rotor by the actuator in this embodiment;

FIGS. 17A to 17E are schematic views for showing trails of the chip member when the frequency of the driving signals are 0, 50, 100, 150 and 200 kHz;

DETAILED DESCRIPTION OF THE EMBODIMENT

Figure 1:
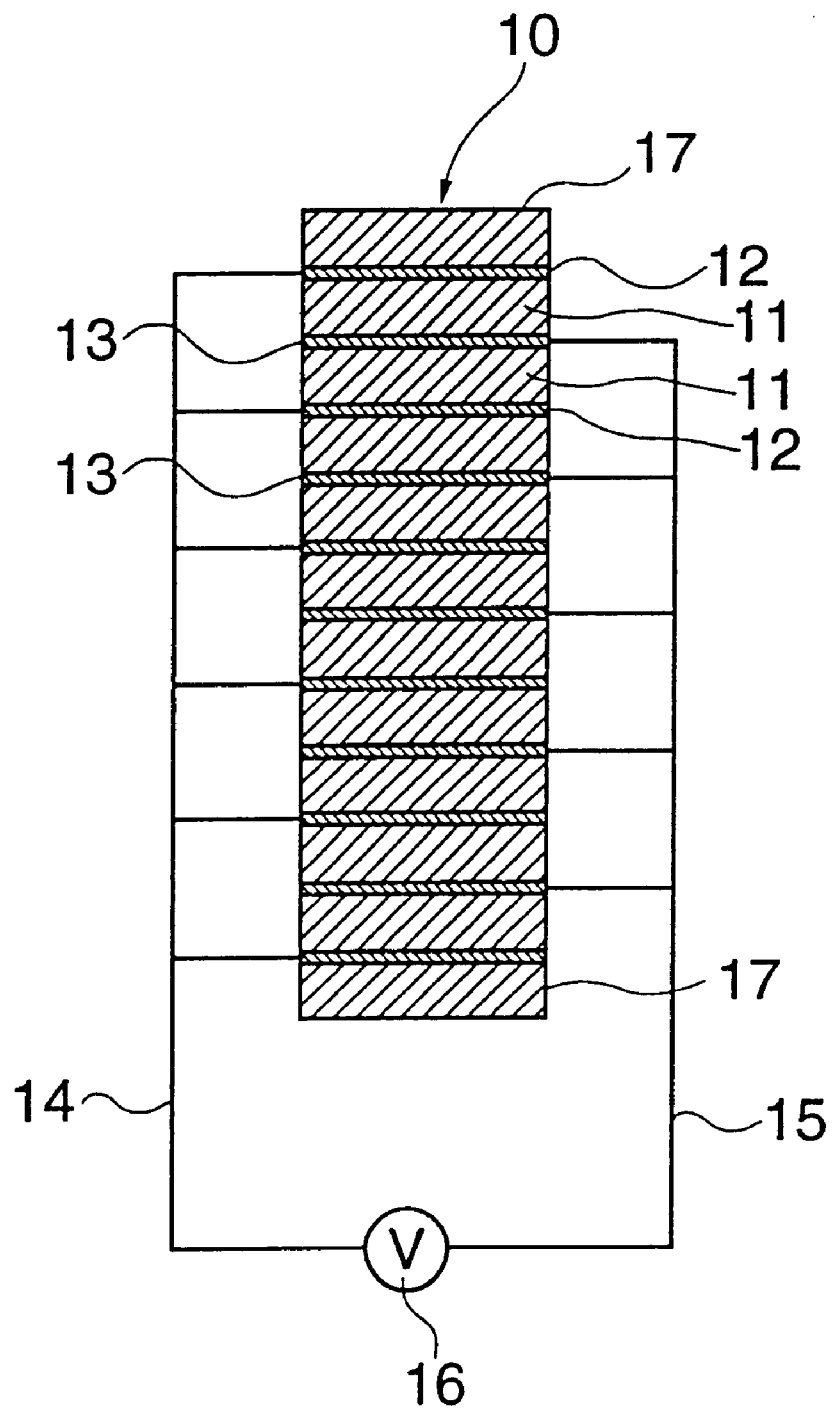
FIG. 1 is a front view showing a configuration of a lamination type piezoelectric device used as a displacing device in an embodiment of this invention.

An embodiment of this invention is described. A configuration of a lamination type piezoelectric device used as a displacing device in this embodiment is shown in FIG. 1. The lamination type piezoelectric device 10 is formed by piling up of a plurality of ceramic thin plates 11 and electrodes 12 and 13 alternately disposed. The ceramic thin plates 11 is made of such as PZT showing piezoelectric characteristic. The ceramic thin plates 11 and the electrodes 12 and 13 are fixed by an adhesive. Two groups of electrodes 12 and 13 which are alternately disposed are respectively connected to a driving power source 16 via cables 14 and 15. When a predetermined voltage is applied between the cables 14 and 15, an electric field is generated in each ceramic thin plate 11 disposed between the electrodes 12 and 13. The direction of the electric field in the ceramic thin plates alternately disposed is the same. Thus, the ceramic thin plates 11 are piled in a manner so that polarization direction of the ceramic thin plates 11 alternately disposed becomes the same. In other words, the polarization directions of adjoining two ceramic thin plates are opposite to each other. Furthermore, protection layers 17 are provided on both ends of the piezoelectric device 10.

Figure 2:
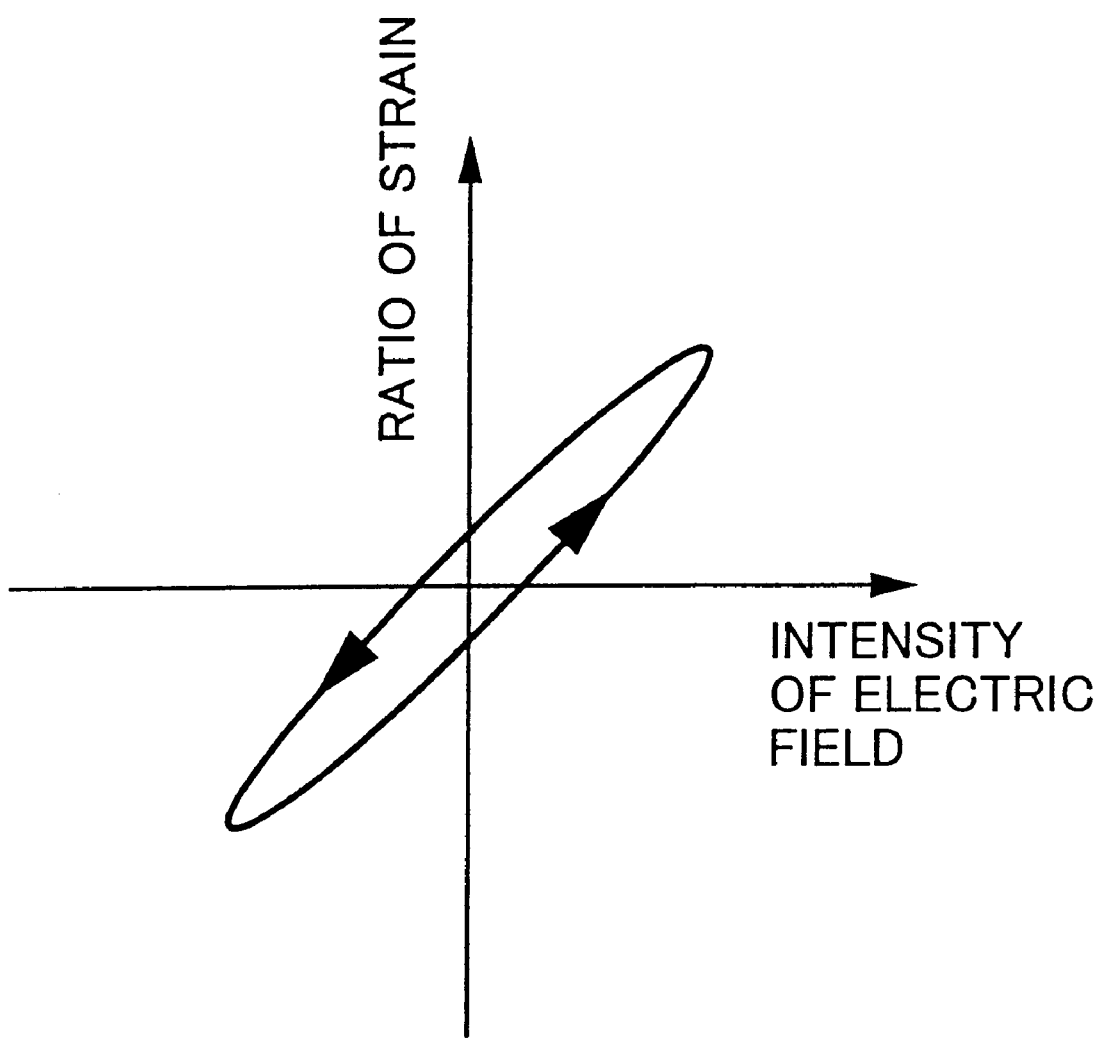
FIG. 2 is a graph for showing a relation between displacement of a piezoelectric device and electric field applied to the piezoelectric device.

When a DC driving voltage is applied between the electrodes 12 and 13, each ceramic thin plate 11 expands or contracts in the same direction. Thus, whole the piezoelectric device 10 can expand and contract. When the electric field in the ceramic thin plate 11 is sufficiently small and hysteresis of the displacement of the ceramic thin plate 11 can be ignored, it is possible to consider that a relation between the displacement of the piezoelectric device 10 and the electric field generated between the electrodes 12 and 13 is linear. The relation between the displacement of the piezoelectric device and the electric field is shown in FIG. 2. In FIG. 2, the abscissa shows the intensity of electric field and the ordinate shows the ratio of strain of the piezoelectric device.

When an AC driving voltage (signal) is applied between the electrodes 12 and 13 by the driving power source 16, all the ceramic thin plates 11 repeat the expansion and the contraction in the same direction corresponding to the intensity of the electric fields. As a result, the piezoelectric device 10 can repeat the expansion and the contraction. The piezoelectric device 10 has an inherent resonance frequency defined by the configuration and the electric characteristics thereof. When the frequency of the AC driving voltage coincides with the resonance frequency of the piezoelectric device 10, the impedance of the piezoelectric device 10 is reduced and the displacement thereof increases. Since the displacement of the piezoelectric device 10 is small with respect to the size thereof, it is preferable to utilize the resonance phenomenon for driving the piezoelectric device by a low driving voltage.

Figure 3:
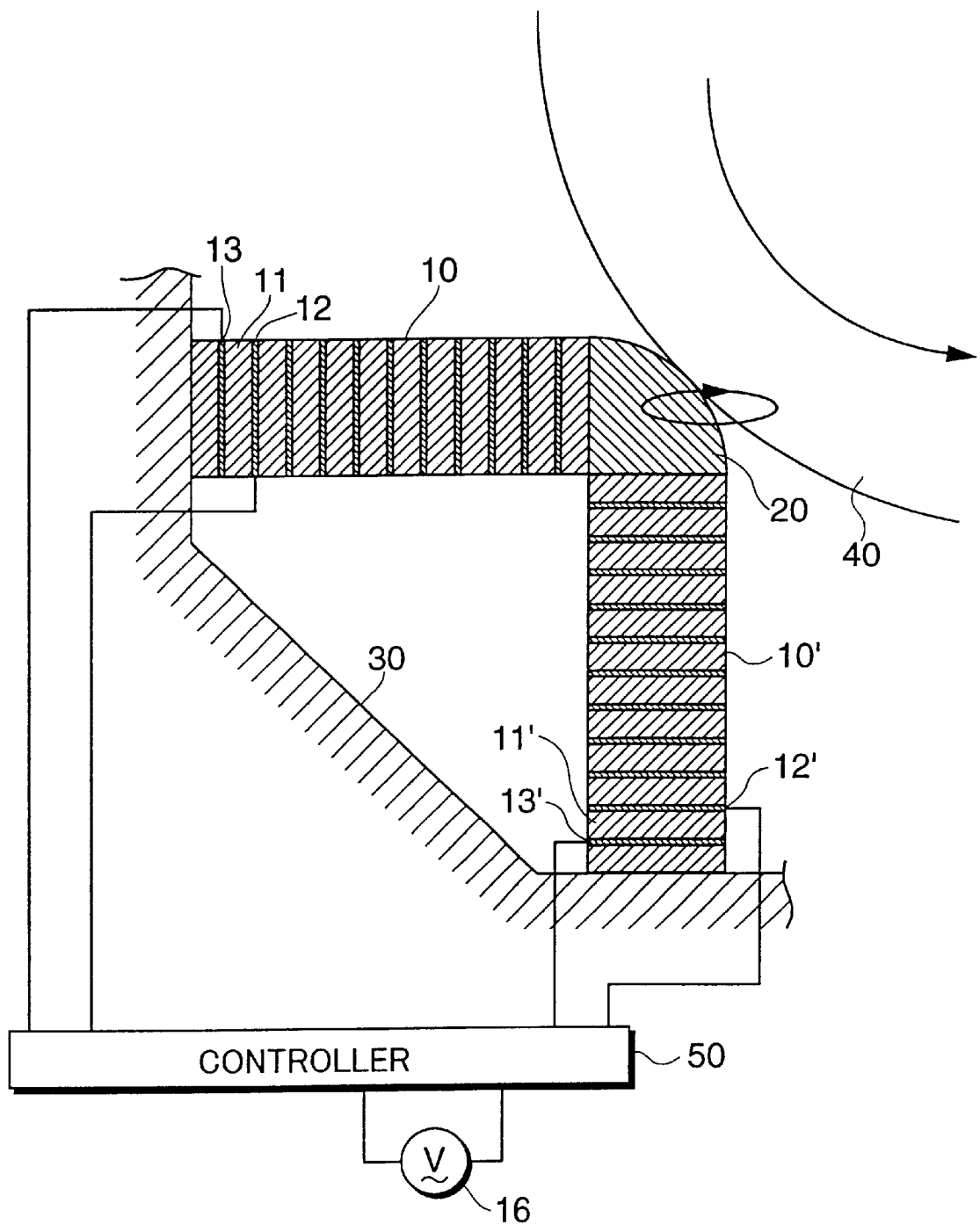
FIG. 3 is front view for showing a configuration of an actuator in this embodiment.

A configuration of a truss type actuator in this embodiment is shown in FIG. 3. A first piezoelectric device 10 and a second piezoelectric device 10' serving as displacing devices are disposed to cross substantially at right angle. A chip member 20 serving as a compound member for compounding the displacements of the first piezoelectric device 10 and the second piezoelectric device 10' is disposed at crossing point and fixed on respective top ends of the first piezoelectric device 10 and the second piezoelectric device 10' by an adhesive. Base ends of the first piezoelectric device 10 and the second piezoelectric device 10' are respectively fixed on a base member 30 by an adhesive. As a material of the chip member 20, it is preferable to use a material such as tungsten having high friction factor and high wear resistance. As a material of the base member 30, it is preferable to use a material such as stainless steel having high workability and strength. As a material of the adhesive, it is preferable to use a material such as epoxy resin having high adhesive strength. The first piezoelectric device 10 and the second piezoelectric device 10' are substantially the same as the piezoelectric device 10 shown in FIG. 1. Elements for constituting the second piezoelectric device 10' are distinguished from those of the first piezoelectric device 10 by adding (') to the numerals.

The electrodes 12 and 13 of the first piezoelectric device 10 and the electrodes 12' and 13' of the second piezoelectric device 10' are respectively connected to a controller 50. A single driving power source 16 is connected to the controller 50. The controller 50 supplies the driving power to alternative of the first piezoelectric device 10 and the second piezoelectric device 10'.

In this actuator, the first piezoelectric device 10 and the second piezoelectric device 10' are alternatively driven. In the following description, the first piezoelectric device 10 is driven as an example. When the first piezoelectric device 10 is driven, the vibration due to the driving of the first piezoelectric device 10 is transmitted to the second piezoelectric device 10' via the base member 30. By controlling the driving voltage applied to the first piezoelectric device 10 in a manner so that the first piezoelectric device 10 and the second piezoelectric device 10' are vibrated at resonance frequencies with a predetermined phase difference, the chip member 20 provided at crossing point of the first piezoelectric device 10 and the second piezoelectric device 10' can be moved for trailing an elliptic or a circular trail. When the chip member 20 is pushed on, for example, a cylindrical surface of a rotor 40 which can rotate around a predetermined axis, the elliptic or circular movement of the chip member 20 can be converted to the rotation of the rotor 40. Alternatively, when the chip member 20 is pushed on a plane surface of a rod shaped member (not shown), the elliptic or circular movement of the chip member 20 can be converted to a rectilinear motion of the rod shaped member. As a material of the rotor 40, it is preferable to use a material such as aluminum having a light weight. Furthermore, it is preferable to form an anodic oxide coating on the surface of the rotor 40 for preventing the wear due to the friction between the chip member 20 and the rotor 40.

Figure 4:
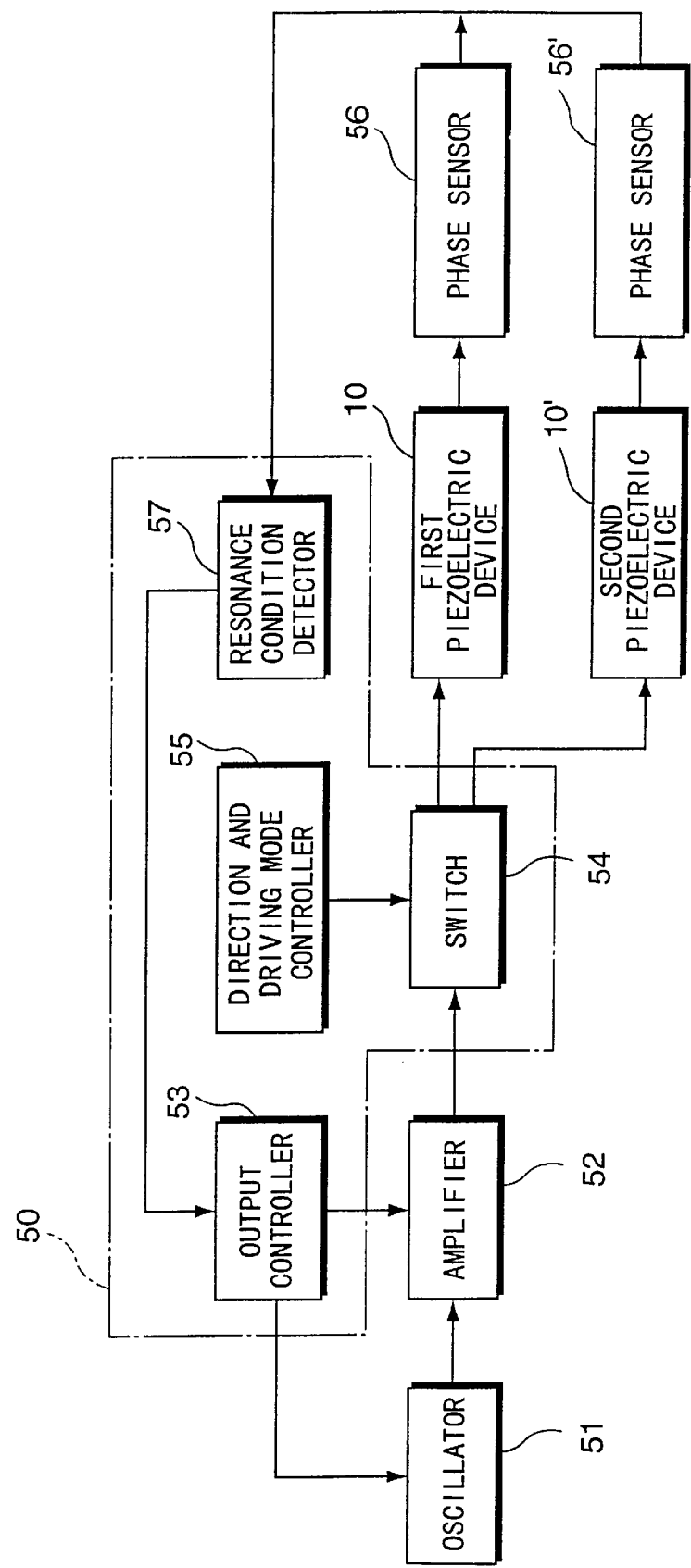
FIG.4 is a block diagram for showing a configuration of a driving circuit of the actuator in this embodiment.

A block diagram of a driving circuit is shown in FIG. 4. An oscillator 51 generates sine wave signals having a predetermined frequency. An amplifier 52 amplifies an amplitude of the sine wave signals from the oscillator 51 corresponding to a control signal. An output controller 53 controls the oscillation frequency of the oscillator 51 and the amplification factor of amplification of the amplifier 52 corresponding to the rotation speed and the driving torque of the rotor 40. A direction and driving mode controller 55 controls a switch 54 corresponding to the rotation direction and the driving mode (the same phase mode or the opposite phase mode) of the rotor 40. The switch 54 supplies the driving signals amplified by the amplifier 52 to alternative of the first piezoelectric device 10 and the second piezoelectric device 10' selected corresponding to the control signal from the direction and driving mode controller 55. Phase sensors 56 and 56' respectively provided on the first piezoelectric device 10 and the second piezoelectric device 10' alternatively sense the phase and the amplitude of vibrations of the first piezoelectric device 10 and the second piezoelectric device 10' due to the vibrations of the other piezoelectric device when the first piezoelectric device 10 or the second piezoelectric device 10' is not driven. A resonance condition detector 57 judges whether the first piezoelectric device 10 or the second piezoelectric device 10' is resonantly vibrated or not by the output from the phase sensor 56 or 56'. Furthermore, the resonance condition detector 57 feeds back an output signal to the output controller 53 for adjusting the oscillation frequency of the oscillator 51 and the amplification factor by the amplifier 52. The output controller 53, the switch 54, the direction and driving mode controller 55 and the resonance condition detector 57 constitute the controller 50. When the frequency $f_3$ of the driving voltage of the piezoelectric devices is fixed as described below, the oscillator 51 and the amplifier 52 are not necessary to be adjusted. In that case, the driving power source 16 can be configured by the oscillator 51 and the amplifier 52, and the controller 50 can be configured by only the switch 54.

In the actuator shown in FIG. 3, the first piezoelectric device 10 and the second piezoelectric device 10' are disposed for crossing at right angle. When one piezoelectric device, for example the first piezoelectric device 10 expands, the other piezoelectric device, for example, the second piezoelectric device 10' receives a force in a direction perpendicular to the polarization direction from the first piezoelectric device 10. When the pressure is applied to the second piezoelectric device 10', electric charges moves from the ceramic thin plates 11 to the electrodes 12 or 13, so that a voltage is generated between the electrodes 12 and 13. The relation between the voltage generated by the second piezoelectric device 10' and the pressure applied thereto is opposite to the relation shown in FIG. 2. Furthermore, the force applied from the first piezoelectric device 10 and received by the second piezoelectric device 10' can be regarded to be in proportion to the displacement of the first piezoelectric device 10. Thus, it can be regarded that the voltage generated by the second piezoelectric device 10' is in proportion to the displacement of the first piezoelectric device 10. By sensing the voltage between the electrodes 12 and 13, the displacement of the first piezoelectric device 10 can be known. Since the first piezoelectric device 10 is driven by the AC driving signals, the second piezoelectric device 10' outputs the AC voltage having the same phase as the phase of the displacement of the first piezoelectric device 10.

Since the displacement of one of the first piezoelectric device 10 and the second piezoelectric device 10' when it is driven can be detected by the voltage generated by the other, the displacement of the driven piezoelectric device 10 or 10' that is the radius of the trail of the chip member 20 can be known from the voltage. By controlling the voltage of the driving signals applied to the driven piezoelectric device 10 or 10' corresponding to the voltage from the other piezoelectric device 10' or 10, the rotation speed of the rotor 40 driven by the actuator can be controlled.

Generally, when the chip member 20 is contacted with a predetermined pressure, the vibration condition of the actuator including the first piezoelectric device 10, the second piezoelectric device 10', the chip member 20 and the base member 30 changes. When the actuator receives a pressure and a reaction force of the friction from the rotor 40, the rigidity of the first piezoelectric device 10, the second piezoelectric device 10' and the base member 30 is changed. Furthermore, when the base member 30 is fixed on a housing of an apparatus using the actuator, a constraint condition of the base member 30 changes, so that the vibration condition is changed, too. Thus, the driving circuit shown in FIG. 4 has a configuration for compensating the change of the vibration condition due to the external factors by adjusting the frequency of the driving signals. After assembling the apparatus or prior to the use in several conditions, the switch 54 is controlled by the direction and driving mode controller 55 for driving the first piezoelectric device 10 and the second piezoelectric device 10' alternatively in a manner so that the first piezoelectric device 10 and the second piezoelectric device 10' are respectively driven in the same phase mode and in the opposite phase mode. At this time, the phases of the current and the voltage in the first piezoelectric device 10 and the second piezoelectric device 10' are sensed by the phase sensors 56 and 56'. Frequencies of the normal vibration of the first piezoelectric device 10 and the second piezoelectric device 10' are obtained by conditions when the phases of the current and the voltage are coincide with each other. For example, a mean value of the frequencies of the normal vibration of the first piezoelectric device 10 and the second piezoelectric device 10' is used as a proper frequency of the driving signals.

Figure 5:
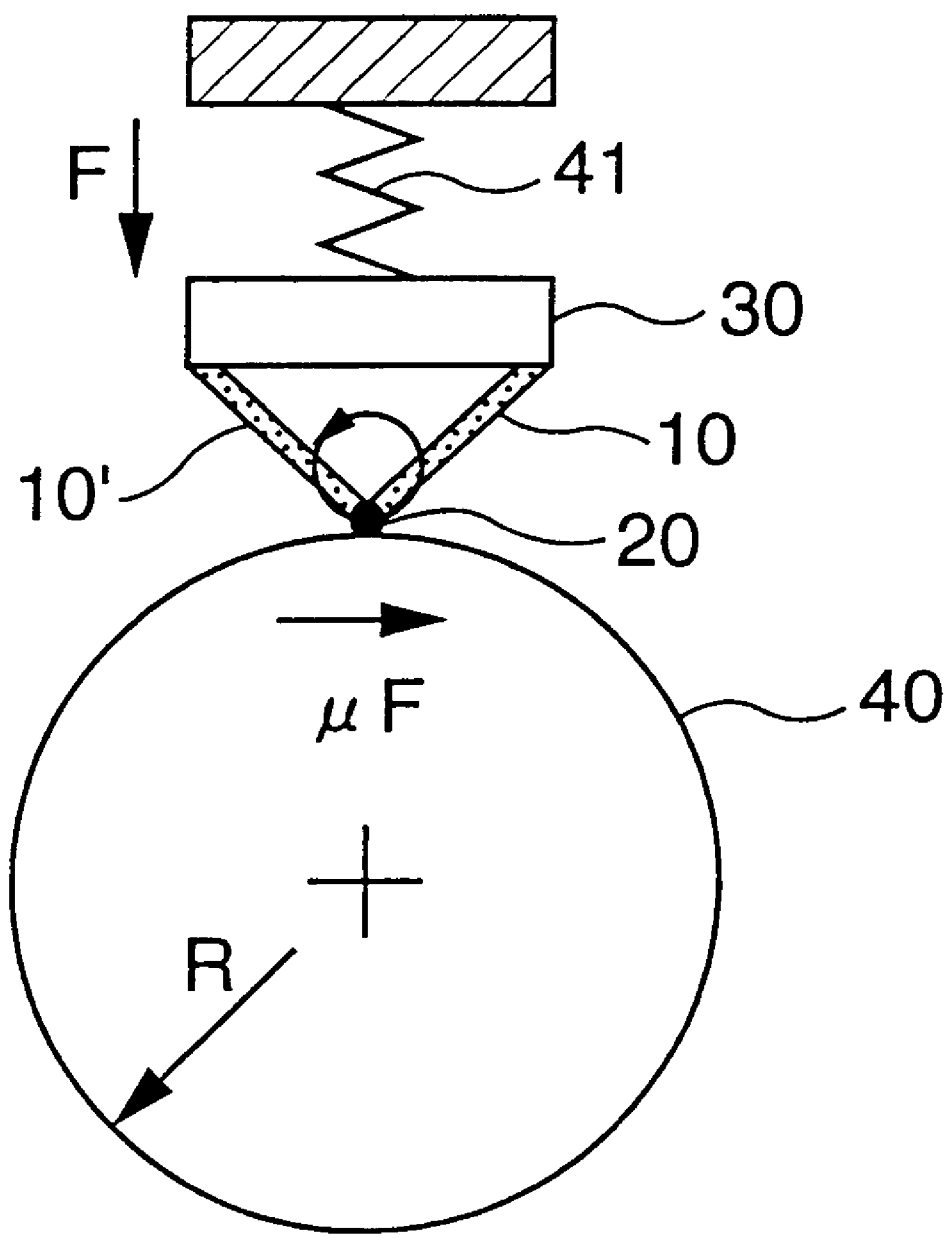
FIG. 5 is a schematic view for showing the actuator pressed on a rotor in this embodiment.
Figure 7A:
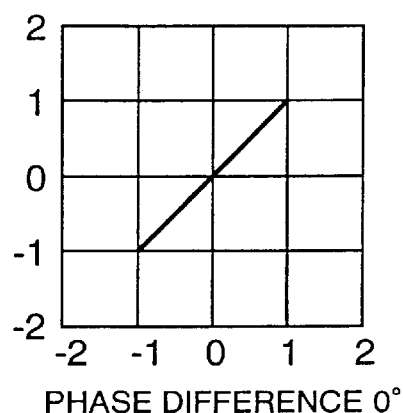
FIGS. 7A to 7E are graphs for showing trails of a chip member when amplitude of vibrations of two piezoelectric devices are equal to each other but the phase difference of the vibrations are respectively 0, 45, 90, 135 and 180 degrees.
Figure 7B:
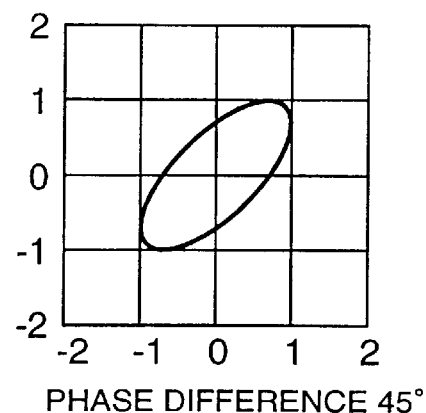
Figure 7C:
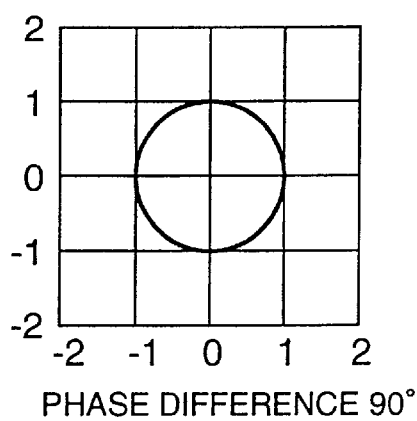
Figure 7D:
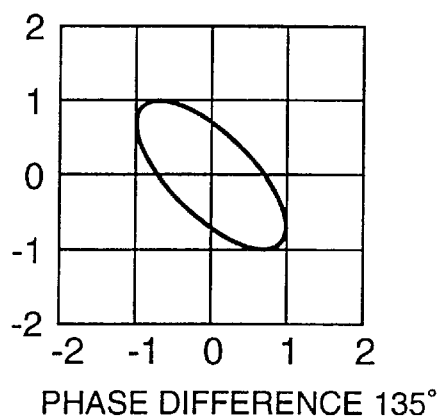
Figure 7E:
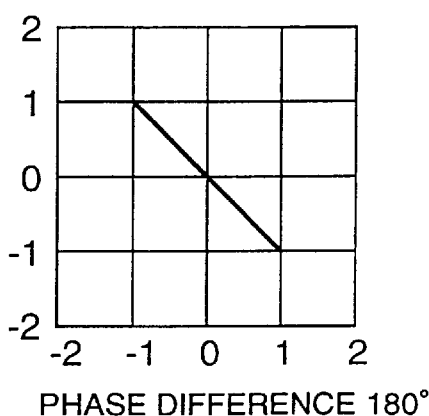

A principle of the rotation of the rotor 40 by the actuator is described. FIG. 5 shows that the actuator shown in FIG. 3 is pressed on the rotor 40 by a pressure F of a spring 41. In FIG. 5, the symbol $\mu$ designates the friction factor.

When the frequency of the driving signals applied to the first piezoelectric device 10 or the second piezoelectric device 10' is small and the rotation speed of the chip member 20 is slow, the actuator follows the displacement of the chip member 20 by the pressure F of the spring 41. Thus, the chip member 20 cannot be departed from the surface of the rotor 40, so that the chip member 20 is reciprocally driven with contacting the rotor 40. Thus, the rotor 40 cannot be rotated.

On the other hand, when the frequency of the driving signals applied to the first piezoelectric device 10 or the second piezoelectric device 10' is larger and the rotation speed of the chip member 20 is fast, the actuator cannot follow the displacement of the chip member 20, so that the chip member 20 can temporarily be departed from the surface of the rotor 40. Thus, the chip member 20 can be moved in a predetermined direction while the chip member 20 is departed from the surface of the rotor 40, and the chip member 20 can be moved in the opposite direction with the rotor 40 while the chip member 20 contacts the rotor 40. As a result, the rotor 40 can be rotated.

The rotation mechanism of the rotor 40 by the actuator is shown in FIGS. 6A to 6E. FIGS. 6A and 6E show that both of the first piezoelectric device 10 and the second piezoelectric device 10' expand and the chip member 20 contacts the surface of the rotor 40. FIG. 6B shows that the first piezoelectric device 10 contracts, the second piezoelectric device 10' expands and the chip member 20 is departed from the surface of the rotor 40. FIG. 6C shows that both of the first piezoelectric device 10 and the second piezoelectric device 10' contract and the chip member 20 is departed from the surface of the rotor 40. FIG. 6D shows that the first piezoelectric device 10 expands, the second piezoelectric device 10' contracts, but the actuator follows the movement of the chip member 20 so that the chip member 20 contacts the surface of the rotor 40. As can be seen from FIGS. 6A to 6E, it is possible to rotate the rotor 40 by departing the chip member 20 from the surface of the rotor 40.

When two independent movements crossing at right angle are compounded, the crossing point moves along an elliptic trail including the circular trail defined by the Lissajous' equation. FIGS. 7A to 7E show trails of the chip member 20 when the amplitude of the vibrations of the first piezoelectric device 10 and the second piezoelectric device 10' are equal to each other but the phase difference of the vibrations are respectively 0, 45, 90, 135 and 180 degrees.

Subsequently, a trail by which the driving efficiency becomes the largest will be obtained. When the first piezoelectric device 10 and the second piezoelectric device 10' are disposed for crossing at right angle and driven by the sine wave driving signals having a predetermined phase difference, the trail of the chip member 20 is designated by the following equations. Hereupon, a symbol "$\omega$" shown an angular velocity; a symbol "t" shows time; a symbol "$\theta$" shows the phase difference; and the amplitude of the vibrations of the piezoelectric devices are respectively selected to be "1".

$$x = \sin \omega t$$

$$y = \sin(\omega t + \theta)$$

Figure 8A:
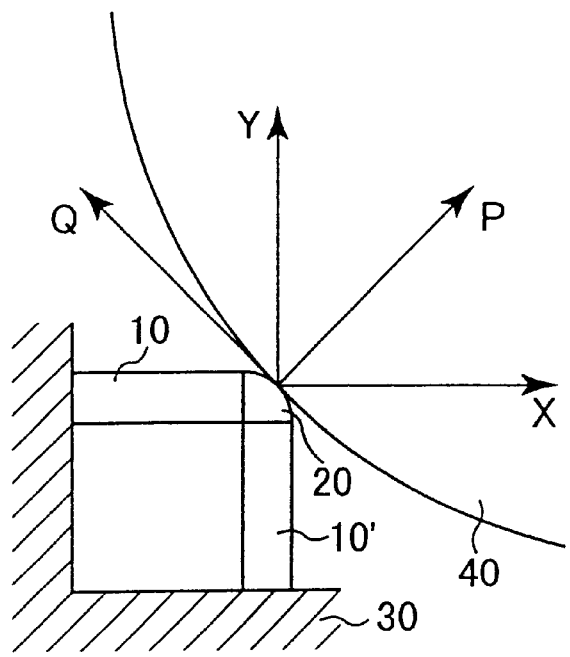
FIG. 8A is a schematic view for showing relations of a center of the rotor and two piezoelectric devices.

As can be seen from FIG. 8A, the center of the rotor 40 is positioned on a bisector of the crossing angle of the first piezoelectric device 10 and the second piezoelectric device 10'. When the bisector or the normal of the rotor 40 at contacting point with the chip member 20 is set to be the abscissa P (P-axis) and a line perpendicular to the bisector or the tangent of the rotor 40 is set to be the ordinate Q (Q-axis), the above-mentioned equations are converted as follows.

$$p = (\sin(\omega t + \theta) + \sin \omega t)/\sqrt{2}$$

$$q = (\sin(\omega t + \theta) - \sin \omega t)/\sqrt{2}$$

When the $\omega t$ is deleted from the above-mentioned equations, $$p^2/2 \cos^2(\theta/2) + q^2/2 \sin^2(\theta/2) = 1.$$

Figure 8B:
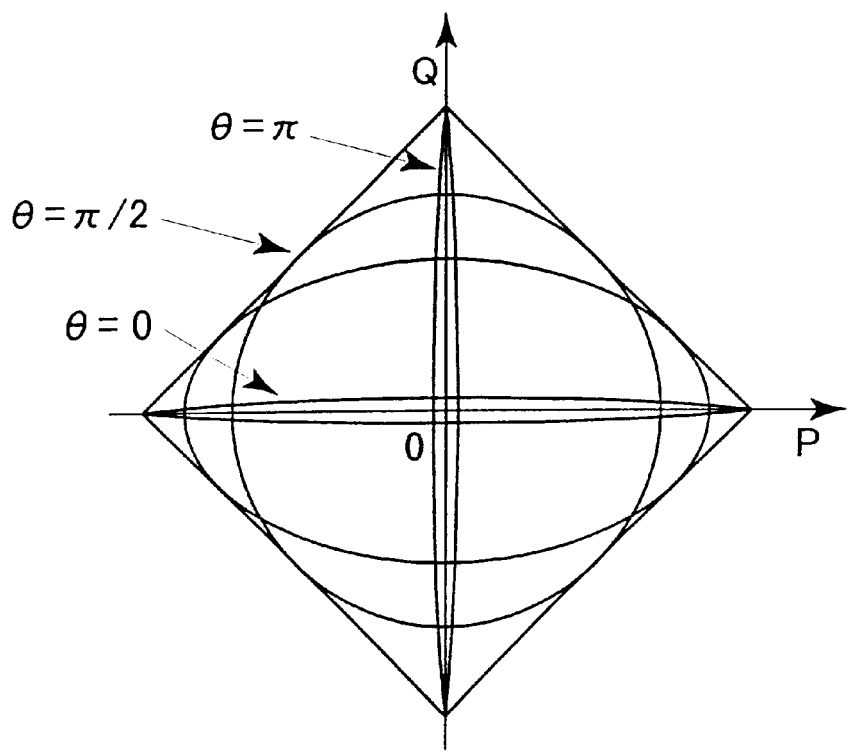
FIG. 8B is a graph for showing trails of the chip member when the phase difference θ of the vibrations of two piezoelectric devices is varied.

The trail of the chip member 20 becomes an ellipse having the intercepts of $\pm \sqrt{2} \cos(\theta/2)$ on the P-axis and the intercepts of $\pm \sqrt{2} \sin(\theta/2)$. When the phase difference $\theta$ is varied, the ellipse deforms with inscribing a square as shown in FIG. 8B.

Figure 9:
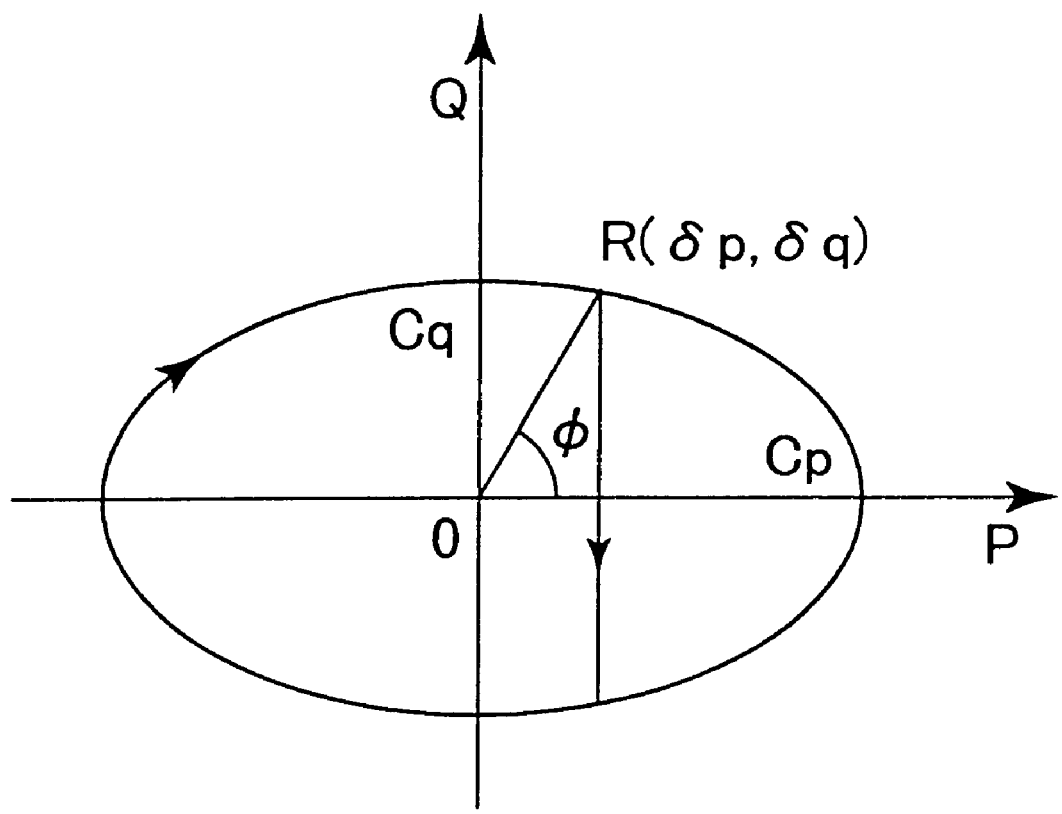
FIG. 9 is a graph for showing an example of the trail of the chip member.

The driving efficiency of the actuator is estimated under a condition that the work W, which is in proportion to a product of rotation speed and rotation force, becomes the largest. When the phase difference $\theta$ between the driving signals for the first piezoelectric device 10 and the second piezoelectric device 10' is varied, the shape of the trail of the chip member 20 deforms and the rotation speed of the rotor 40 is varied. When the pressure N is varied, the rotation force owing to the friction is varied. An example of the trail of the chip member 20, in which the displacement in the normal direction is restricted by the pressure, is shown in FIG. 9. Coordinates of a point R on the trail are shown by ($\delta p$, $\delta q$); an angle between a line OR and the P-axis is shown by $\phi$; and intercepts of the trail are shown by Cp and Cq.

$$\delta p = \sqrt{2} \cos(\theta/2) \cdot \cos \phi = Cp \cdot \cos \phi$$

$$\delta q = \sqrt{2} \sin(\theta/2) \cdot \sin \phi = Cq \cdot \sin \phi$$

The compounded force of the first piezoelectric device 10 and the second piezoelectric device 10' in the normal direction becomes the largest when the chip member 20 reaches to the intercept (Cp,0) on the P-axis under the no-load condition. At this time, the phase of $\omega t = (\pi - \theta)/2$. A force generated by a single piezoelectric device becomes $f_0 \cdot \sin((\pi - \theta)/2) = f_0 \cdot \cos(\theta/2)$, when the largest force of the piezoelectric device is shown by the symbol $f_0$. Thus, the largest value F of the compounded force of the first piezoelectric device 10 and the second piezoelectric device 10' in the normal direction is shown as follows.

$$F = \sqrt{2} f_0 \cdot \cos(\theta/2) = Cp \cdot f_0$$

A relation between the pressure N and the coordinate $\delta p$ is shown by the following equation.

$$\delta p = Cp \cdot (1 - 2N/F) = Cp - 2N/f_0$$

Furthermore, a relation between the pressure N and the angle $\phi$ is shown by the following equation.

$$N = f_0 \cdot (Cp - \delta p)/2 = f_0 \cdot Cp(1 - \cos \phi)/2$$

On the other hand, the rotation speed V and the rotation force F of the rotor 40 are shown by the following equations.

$$V = 2\delta q/(T \cdot 2\phi/2\pi) = 2\pi \cdot \delta q/T \cdot$$

$$F = \mu N$$

Accordingly, the work W of the actuator is shown as follows.

$$W \; F \cdot V = 2\mu N \cdot \pi \cdot q/T \cdot \phi =$$

$$\mu \cdot F_0 \cdot Cp \cdot (1 - \cos \phi) \cdot Cp \cdot \sin \phi/T \cdot \phi =$$

$$\mu \cdot F_0 \cdot \sqrt{2} \cos(\theta/2) \cdot \sqrt{2} \sin(\theta/2) \cdot$$

$$(1 - \cos \phi) \cdot \sin \phi/T \cdot \phi =$$

$$(\mu \cdot f_0/T) \cdot \sin \theta \cdot ((1 - \cos \phi) \cdot \sin \phi/\phi)$$

Hereupon, the angles $\phi$ and $\theta$ are independent from each other, so that the work W becomes the largest when the second member and the third member of the above-mentioned equation become the largest. The second member becomes the largest when $\theta = \pi/2$ in a region $0 < \theta \leq \pi$. As can be seen from FIGS. 7A to 7E, when the phase difference is 90 degrees ($\pi/2$), the trail of the chip member 20 becomes a circle. The third member showing the driving condition of the rotor 40 simply increases in a region $0 < \phi \leq \pi/2$. Thus, the third member becomes the largest when $\phi = \pi/2$. As shown in FIG. 9, since the angle $\phi$ is the angle crossing the line OR with the P-axis, the condition $\phi = /2$ means that the trail of the chip member 20 becomes a semicircle.

As mentioned above, the work F of the rotor 40 becomes the largest when the trail of the chip member 20 is the circle under the no-load condition and is restricted as the semicircle by the pressure. The driving efficiency of the actuator becomes the largest simultaneously.

Figure 10A:
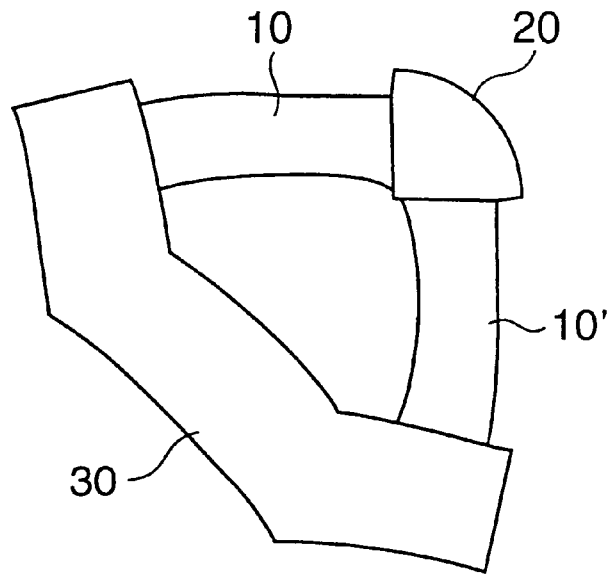
FIG. 10A is a schematic view for showing an example of a expansive vibration of the actuator in the same phase mode in this embodiment.
Figure 10B:
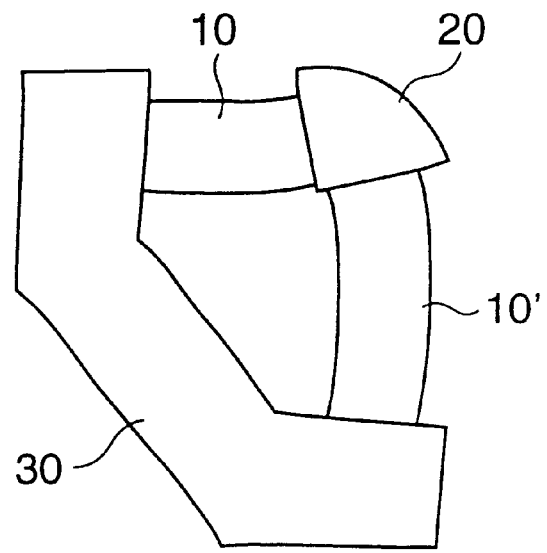
FIG. 10B is a schematic view for showing an example of a expansive vibration of the actuator in the opposite phase mode in this embodiment.

In the actuator in this embodiment, the same phase mode and the opposite phase mode are existed as the normal mode in which both of the first piezoelectric device 10 and the second piezoelectric device 10' are resonantly vibrated in an expansive direction. In the same phase mode, the phase of the vibration of the first piezoelectric device 10 is coincides with that of the second piezoelectric device 10'. In other words, the first piezoelectric device 10 and the second piezoelectric device 10' are vibrated in the same phase. In the opposite phase mode, the phase of the vibration of the first piezoelectric device 10 is opposite to that of the second piezoelectric device 10'. In other words, the phase difference between the vibration of the first piezoelectric device 10 and that of the second piezoelectric device 10' is π (180 degrees). FIG. 10A shows the expansive vibration of the actuator in the same phase mode. FIG. 10B shows the expansive vibration of the actuator in the opposite phase mode. In the vibration in the same phase mode shown in FIG. 10A, the vibration of the first piezoelectric device 10 is transmitted to the second piezoelectric device 10' with the phase difference 0 degree. In the vibration in the opposite phase mode shown in FIG. 10B, the vibration of the first piezoelectric device 10 is transmitted to the second piezoelectric device 10' with the phase difference 180 degree.

Figure 11:
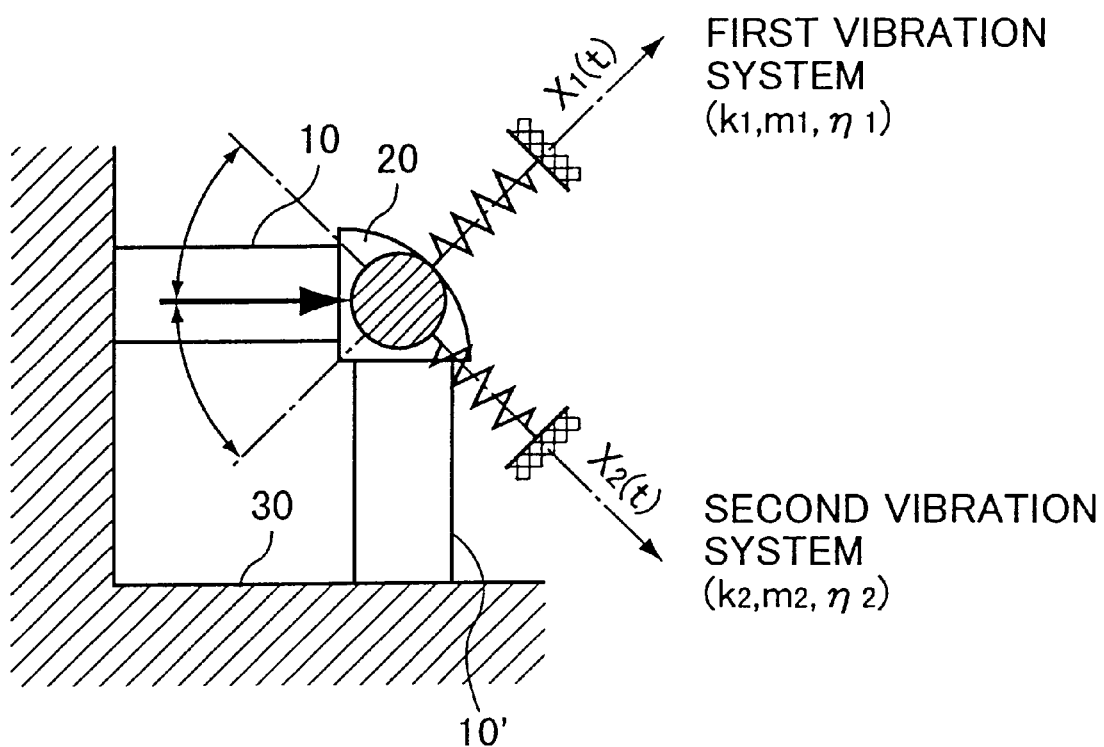
FIG. 11 is a schematic view for showing vibration models for driving the piezoelectric device in the same phase mode and in the opposite phase mode.

The normal mode can be shown in a single vibration system having a weight and a spring. Vibration models for driving the first piezoelectric device 10 are shown in FIG. 11. In FIG. 11, the same phase mode is called "first vibration system" and the opposite phase mode is called "second vibration mode". A displacement x(t) when a sine wave vibration force shown by $f(t)=F_0 \cos \omega t$ is applied to a vibration system having one degree of freedom having a spring constant k, a mass of the weight m and a viscosity η is shown by the following equation (1).

$$x(t)=X \cdot \cos(\omega t - \phi) \qquad (1)$$

An amplitude X and a phase delay $\phi$ are shown by the following equations, when a natural frequency is shown by a symbol $\omega_n$; a damping ratio is shown by a symbol $\zeta$; and a static displacement is shown by a symbol $X_0$.

$$X = X_0 / \{(1-(\omega/\omega_n)^2)^2 + (2\zeta \cdot \omega/\omega_n)^2\}^{1/2}$$

$$\phi = \tan^{-1}\{(2\zeta \cdot \omega/\omega_n)/(1-(\omega/\omega_{n1})^2)\}$$

$$\omega_2 \pi f_n = (k/m)^{1/2}$$

$$\zeta = \eta/2(mk)^{1/2}$$

$$X_0 = F_0/k$$

In this actuator, the force generated by the first piezoelectric device 10 is divided into two ways of the first vibration system and the second vibration system. The driving force or excitation force $f_1(t)$ of the first vibration system and the driving force $f_2(t)$ of the second driving system are respectively shown as follows.

$$f_1(t)=f_2(t)=F_0 \cdot \cos \omega t / \sqrt{2}$$

When these driving forces are substituted into the above-mentioned equation (1), the displacement $x_1(t)$ of the first vibration system and the displacement $x_2(t)$ of the second vibration system are respectively shown by the following equations (2).

$$x_1(t)=X_1 \cdot \cos(\omega t - \phi_1)$$

$$x_2(t)=X_2 \cdot \cos(\omega t - \phi_2) \qquad (2)$$

Hereupon, an amplitude $X_1$ and a delay of phase $\phi_1$ of the first vibration system and an amplitude $X_2$ and a delay of phase $\phi_2$ of the second vibration system are shown by the following equations, when natural frequencies of the first and second vibration systems are shown by symbols $\omega_{n1}$ and $\omega_{n2}$; damping ratios of the first and second vibration systems are shown by symbols $\zeta_1$ and $\zeta_2$; and static displacements of the first and second vibration systems are shown by symbols $X_{01}$ and $X_{02}$.

$$X_1 = X_{01}/\{(1-(\omega/\omega_{n1})^2)^2 + (2\zeta_1 \cdot \omega/\omega_{n1})^2\}^{1/2}$$

$$\phi_1 = \tan^{-1}\{(2\zeta_1 \cdot \omega/\omega_{n1})/(1-(\omega/\omega_{n1})^2)\}$$

$$X_2 = X_{02}/\{(1-(\omega/\omega_{n2})^2)^2 + (2\zeta_2 \cdot \omega/\omega_{n2})^2\}^{1/2}$$

$$\phi_2 = \tan^{-1}\{(2\zeta_2 \cdot \omega/\omega_{n2})/(1-(\omega/\omega_{n2})^2)\}$$

$$\omega_{n1}=(k_1/m_1)^{1/2}, \omega_{n2}=(k_2/m_2)^{1/2}$$

$$\zeta_1=\eta_1/2(m_1 k_1)^{1/2}, \zeta_2=\eta_2/2(m_2 k_2)^{1/2}$$

$$X_{01}=F_{01}/\sqrt{2} \cdot k_1, X_{02}=F_{02}/\sqrt{2} \cdot k_2$$

The resonance frequency $\omega_n$ and the damping ratio $\zeta$ in each normal mode can be measured by using an impedance analyzer. The static displacement $X_0$ can be measured by using a laser displacement measuring system. By calculating the frequency ω of the driving signal and the displacement x(t) of each vibration system, the trail of the chip member 20 can be estimated.

As can be seen from FIG. 11, the first vibration system and the second vibration system cross at right angle, so that the chip member 20 can move along a circular trail when the amplitude of the first vibration system coincides with that of the second vibration system and the phase difference between the vibration of the first vibration system and the vibration of the second vibration system is 90 degrees. This condition is shown by the following equations (3).

$$X_{01}/\{(1-(\omega/\omega_{n1})^2)^2 +$$

$$(2\zeta_1 \cdot \omega/\omega_{n1})^2\}^{1/2} = X$$

$$_{02}/\{(1-(\omega/\omega_{n2})^{22}+$$

$$(2\zeta_2 \cdot \omega/\omega_{n2})^2\}^{1/2}\{$$

$$(2\zeta_1 \cdot \omega/\omega_{n1})(1-(\omega/\omega_{n1})^2)\} \times$$

$$\{(2\zeta_2 \cdot \omega/\omega_{n2})/(1-(\omega/\omega_{n2})$$

$$^2)\} = -1 \qquad (3)$$

For simplifying the equations, it is assumed that $\zeta_1=\zeta_2$, and $X_{01}=X_{02}$. When the above-mentioned equations are arranged and the ω is deleted from the equations, the relations of the $\omega_{n1}$, $\omega_{n2}$ and $\zeta$ are shown by the following equation (4).

$$(1-2\zeta^2)/(1-4\zeta^2)=\alpha\omega_{n1}=(\alpha \pm (\alpha^2-1)^{1/2}) \cdot \omega_{n2} \qquad (4)$$

When the damping ratio of the vibration systems are given, a ratio of the resonance frequencies of the piezoelectric devices, by which the circular trail of the chip member owing to the vibration of one piezoelectric device, can be obtained. The frequency $f_3$ of the driving signals is shown by the following equation (5).

$$f_3=\omega/2\pi \qquad (5)$$

$$\omega^2 = 2\omega_{n1}^2 \cdot \omega_{n2}^2 \cdot (1-2\zeta^2)/(\omega_{n1}^{22}+\omega_{n2}^2)$$

Figure 12:
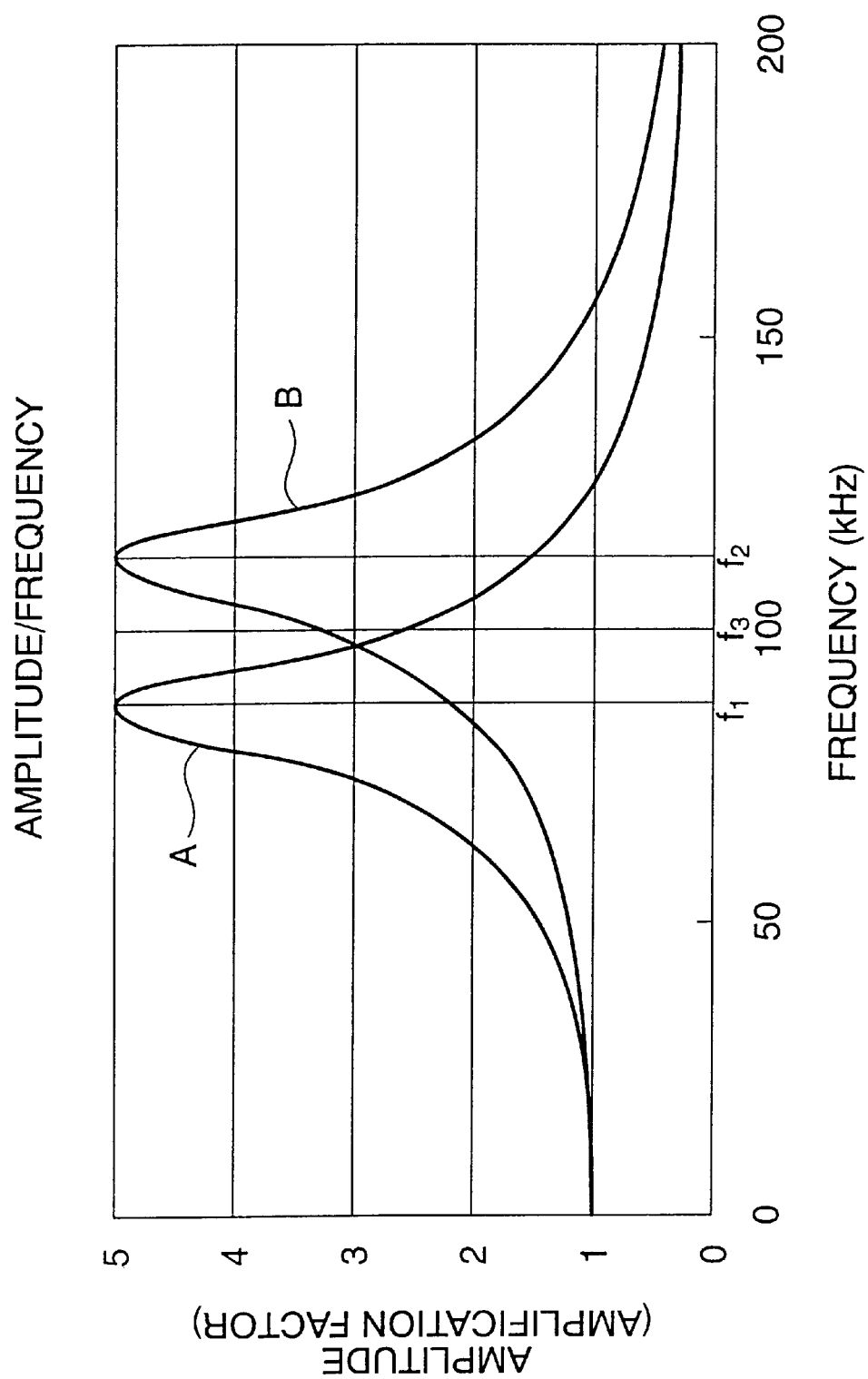
FIG. 12 is a graph for showing characteristic curves of relations between amplitudes and a frequencies of the driving signals in the same phase mode and in the opposite phase mode.
Figure 13:
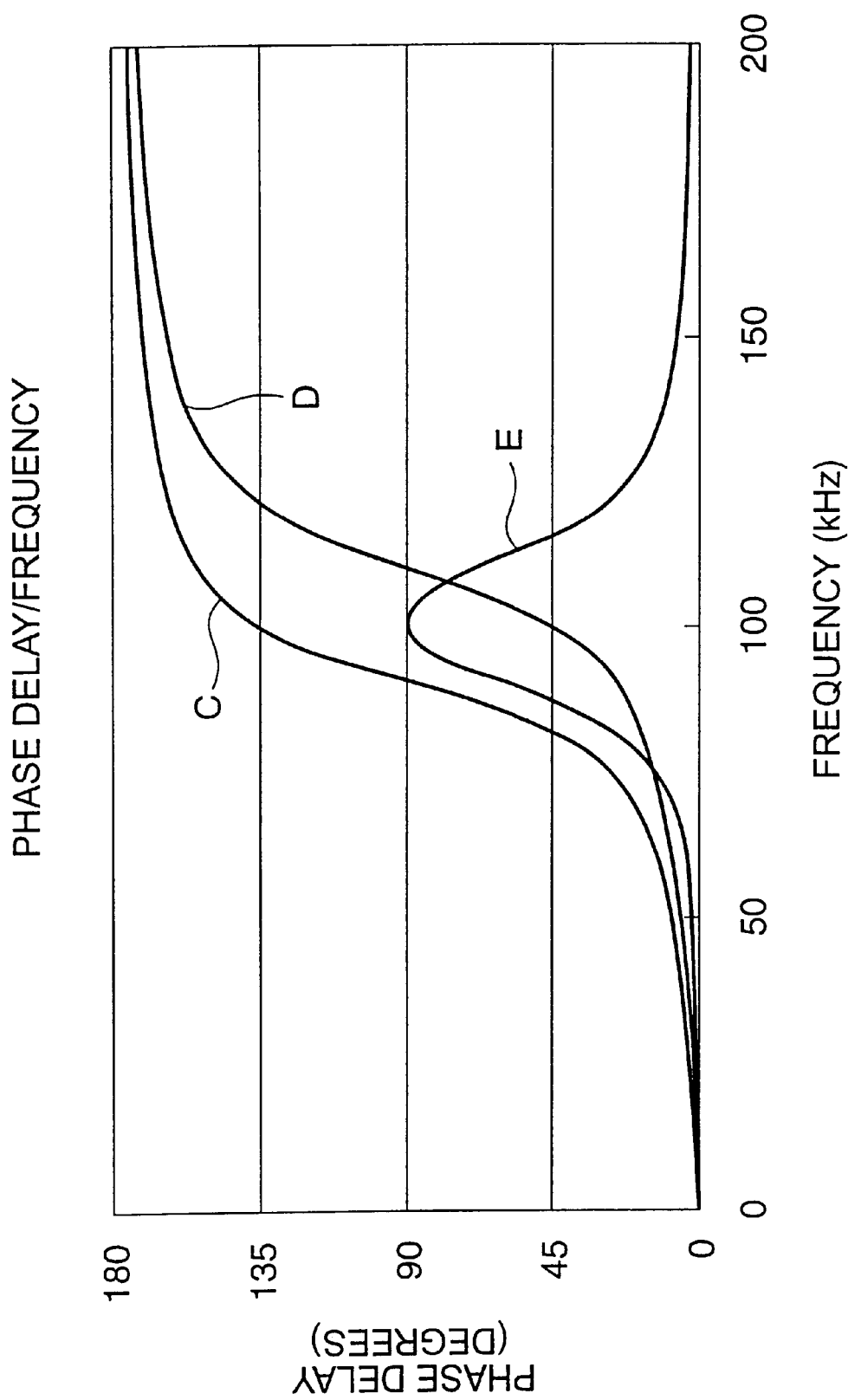
FIG. 13 is a graph for showing characteristic curves of relations between phase delays of the vibration and the frequency of the driving signals.
Figure 14E:
FIGS. 14A to 14E are schematic views for showing trails of the chip member when the frequency of the driving signals are 0, 50, 100, 150 and 200 kHz.
Figure 14D:
Figure 14C:
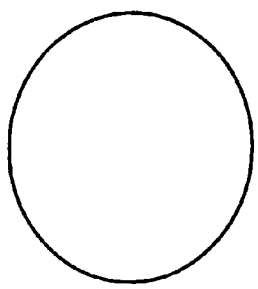
Figure 14B:
Figure 14A:

FIGS. 12 and 13 show the results that the amplitude and the phase delay of each vibration system are calculated when the damping ratio $\zeta$ is set to be 0.1. When the resonance frequency $f_1$ in the same phase mode is 90 kHz, the resonance frequency $f_2$ in the opposite phase mode becomes 110 kHz by the equation (4). The frequency of the driving signals becomes 100 kHz by the equation (5).

In FIG. 12, a characteristic curve "A" shows a relation between the amplitude $X_1$ of the first vibration system and the frequency of the driving signals in the same phase mode.

A characteristic curve "B" shows a relation between the amplitude $X_2$ of the second vibration system and the frequency of the driving signals in the opposite phase mode. As can be seen from FIG. 12, when the frequency of the driving signals is substantially the middle value $f_3$ between both resonance frequencies $f_1$ and $f_2$, the amplitude of the first vibration system coincides with that of the second vibration system, and the phase difference becomes 90 degrees.

In FIG. 13, a characteristic curve "C" shows a relation between the phase delay $\phi_1$ of the first vibration system and the frequency of the driving signals in the same phase mode. A characteristic curve "D" shows a relation between the phase delay $\phi_2$ of the second vibration system and the frequency of the driving signals in the opposite phase mode. A characteristic curve "E" shows a phase difference $\Delta\phi$ between the vibration of the first vibration system and the vibration of the second vibration system.

The first vibration system in the same phase mode is driven by the driving signals having the frequency $f_3$ larger than the resonance frequency $f_1$ thereof, so that the amplitude of the first vibration system is smaller than the largest value after passing the peak and the phase delay is larger than 90 degrees. On the other hand, the second vibration system in the opposite phase mode is driven by the driving signals having the frequency $f_3$ smaller than the resonance frequency $f_2$ thereof, so that the amplitude of the second vibration system is smaller than the largest value before passing the peak and the phase delay is smaller than 90 degrees. Since the phase delay in the same phase mode is larger than that in the opposite phase mode, the chip member 20 rotates in the counterclockwise direction.

FIGS. 14A to 14E respectively show the trails of the chip member 20 when the frequency of the driving signals are 0, 50, 100, 150 and 200 kHz. When the frequency of the driving signals is varied from the middle value $f_3$, the trail of the chip member 20 becomes narrow ellipse.

Figure 15:
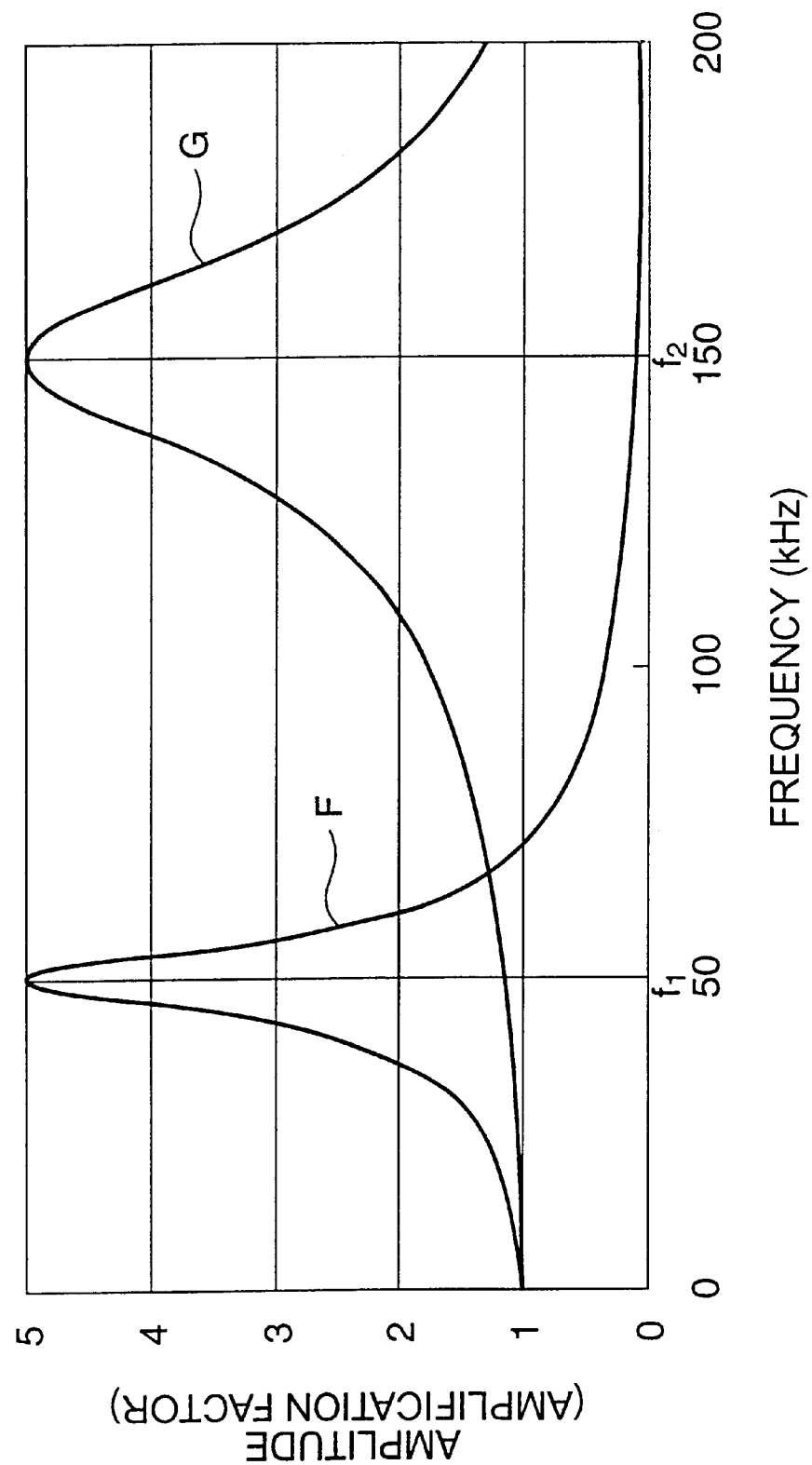
FIG. 15 is a graph for showing characteristic curves of relations between amplitudes and a frequencies of the driving signals in the same phase mode and in the opposite phase mode.
Figure 16:
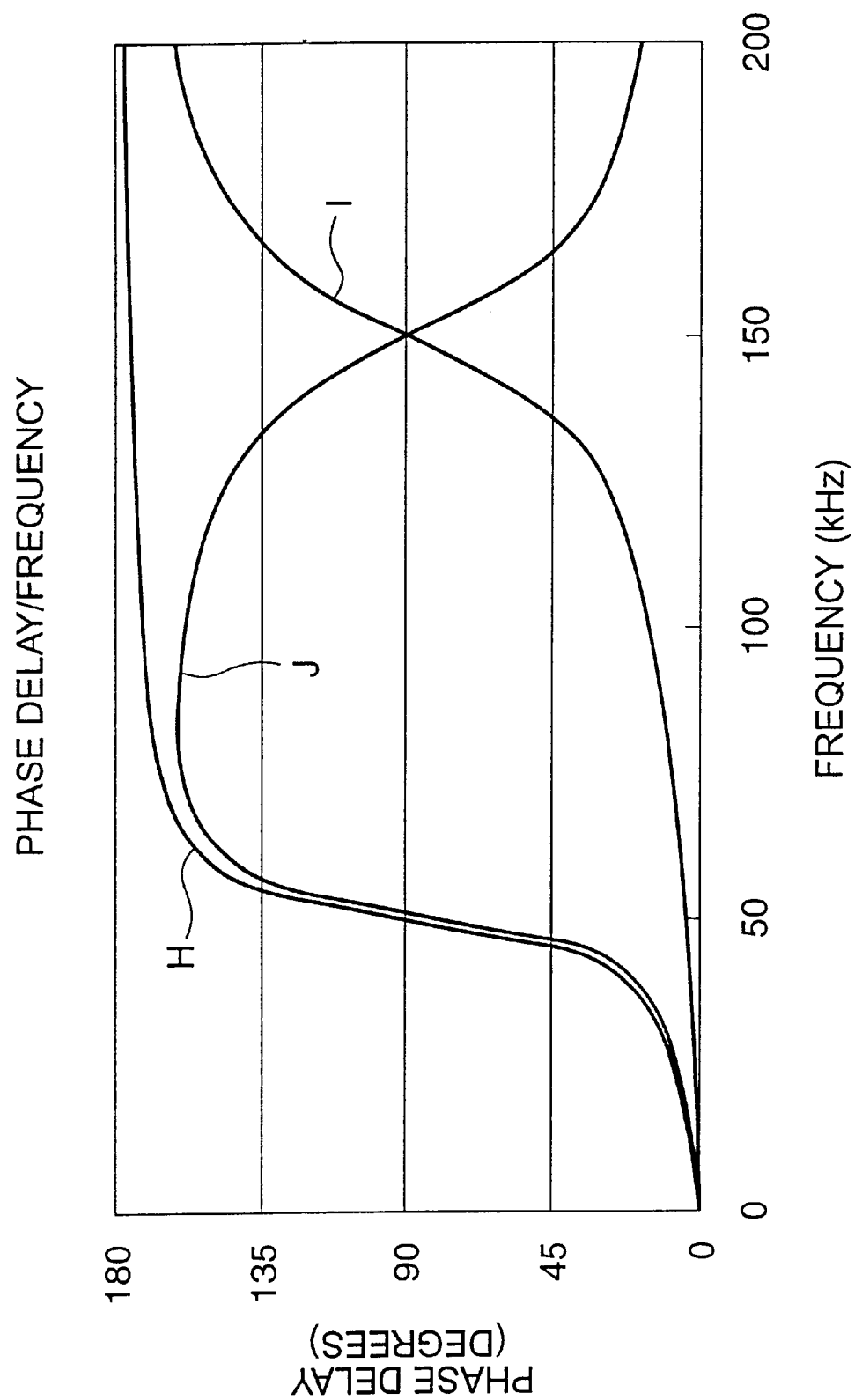
FIG. 16 is a graph for showing characteristic curves of relations between phase delays of the vibration and the frequency of the driving signals.

FIGS. 15 and 16 show the results that the amplitude and the phase delay of each vibration system are calculated when the damping ratio $\zeta$ is set to be 0.1, but the resonance frequency $f_1$ in the same phase mode is largely different from the resonance frequency $f_2$ in the opposite phase mode.

In FIG. 15, a characteristic curve "F" shows a relation between the amplitude $X_1$ of the first vibration system and the frequency of the driving signals in the same phase mode. A characteristic curve "G" shows a relation between the amplitude $X_2$ of the second vibration system and the frequency of the driving signals in the opposite phase mode.

In FIG. 16, a characteristic curve "H" shows a relation between the phase delay $\phi_1$ of the first vibration system and the frequency of the driving signals in the same phase mode. A characteristic curve "I" shows a relation between the phase delay $\phi_2$ of the second vibration system and the frequency of the driving signals in the opposite phase mode. A characteristic curve "J" shows a phase difference $\Delta\phi$ between the vibration of the first vibration system and the vibration of the second vibration system.

FIGS. 17A to 17E respectively show the trails of the chip member 20 when the frequency of the driving signals are 0, 50, 100, 150 and 200 kHz. When the resonance frequency of the first driving system in the same phase mode is largely different from that of the second driving system in the opposite phase mode, the amplitude of the vibration by the driving signals having frequency of the middle vale between the resonance frequencies becomes smaller, and the phase difference becomes near to 180 degrees. Thus, the trail of the chip member 20 becomes narrow and small ellipse in a direction perpendicular to the driving direction.

Figure 18:
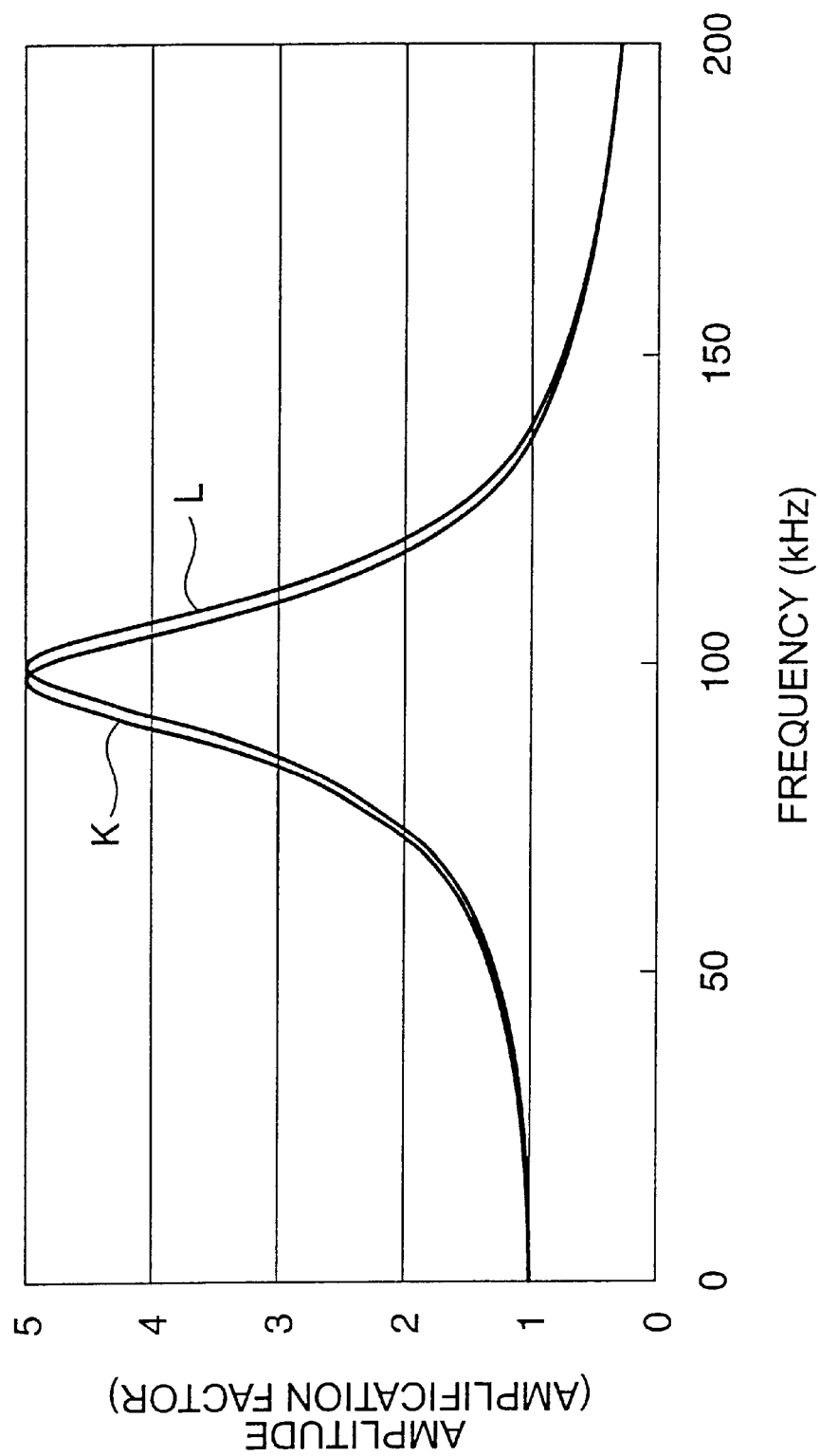
FIG. 18 is a graph for showing characteristic curves of relations between amplitudes and a frequencies of the driving signals in the same phase mode and in the opposite phase mode.
Figure 19:
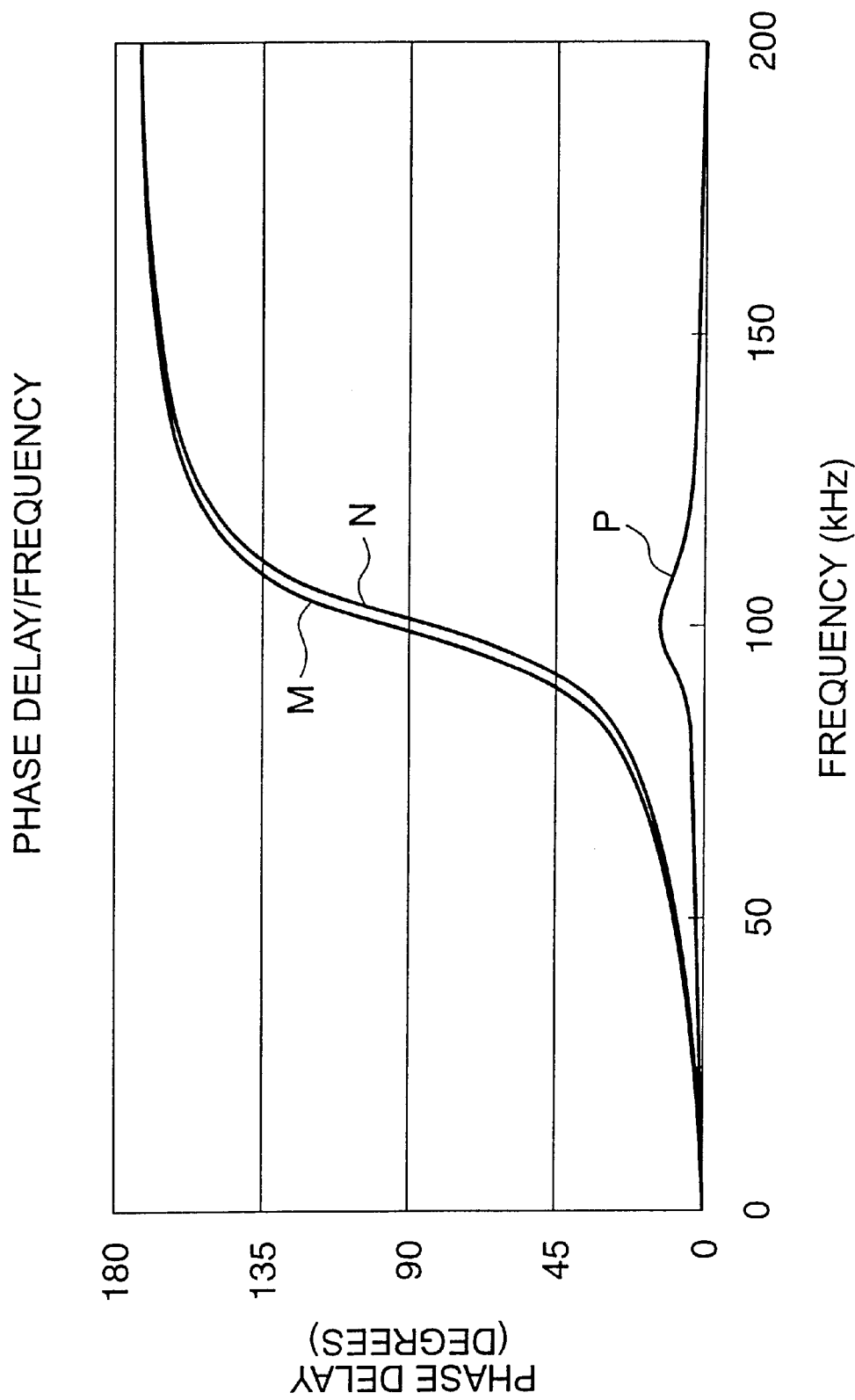
FIG. 19 is a graph for showing characteristic curves of relations between phase delays of the vibration and the frequency of the driving signals.
Figures 20A, 20B, 20C, 20D, 20E:
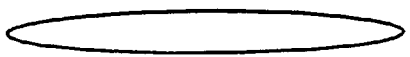
FIGS. 20A to 20E are schematic views for showing trails of the chip member when the frequency of the driving signals are 0, 50, 100, 150 and 200 kHz.

FIGS. 18 and 19 show the results that the amplitude and the phase delay of each vibration system are calculated when the damping ratio $\zeta$ is set to be 0.1, but the resonance frequency $f_1$ in the same phase mode is near to the resonance frequency $f_2$ in the opposite phase mode.

In FIG. 18, a characteristic curve "K" shows a relation between the amplitude $X_1$ of the first vibration system and the frequency of the driving signals in the same phase mode. A characteristic curve "L" shows a relation between the amplitude $X_2$ of the second vibration system and the frequency of the driving signals in the opposite phase mode.

In FIG. 19, a characteristic curve "M" shows a relation between the phase delay $\phi_1$ of the first vibration system and the frequency of the driving signals in the same phase mode. A characteristic curve "N" shows a relation between the phase delay $\phi_2$ of the second vibration system and the frequency of the driving signals in the opposite phase mode. A characteristic curve "P" shows a phase difference $\Delta\phi$ between the vibration of the first vibration system and the vibration of the second vibration system.

FIGS. 19A to 19E respectively show the trails of the chip member 20 when the frequency of the driving signals are 0, 50, 100, 150 and 200 kHz. When the resonance frequency of the first driving system in the same phase mode is near to that of the second driving system in the opposite phase mode, the amplitude of the vibration by the driving signals having frequency of the middle vale between the resonance frequencies becomes larger, and the phase difference becomes near to 0 degree. Thus, the trail of the chip member 20 becomes narrow and large ellipse in a direction parallel to the driving direction.

Alternatively, when the resonance frequency in the same phase mode is larger than that in the opposite phase mode, the phase delay in the opposite phase mode becomes larger than that in the same phase mode. Thus, the chip member 20 is rotated in the clockwise direction. Furthermore, when the second piezoelectric device 10' is driven, the vibration models becomes symmetrical to the vibration models shown in FIG. 11. The chip member 20 is rotated in the clockwise direction. Therefore, the trail of the chip member 20 can be controlled by changing the frequency of the driving signals and/or the vibration condition of the actuator so as to change the resonance frequencies.

A modification of the actuator in this embodiment is described. In this embodiment, the piezoelectric device is used as the displacing device. The ceramics which is a material of the ceramic thin plate 11 has larger damping factor of the vibrations and the smaller magnification factor of the resonant vibration than those of the metal materials. Furthermore, the ceramics is stronger with respect to the pressure but weaker with respect to the tension, so that it will be separated from the adhered faces in the lamination type piezoelectric device. In this modification, a series connection of a single layered piezoelectric device and an elastic member made of a metal is used as a displacing device.

Figure 21:
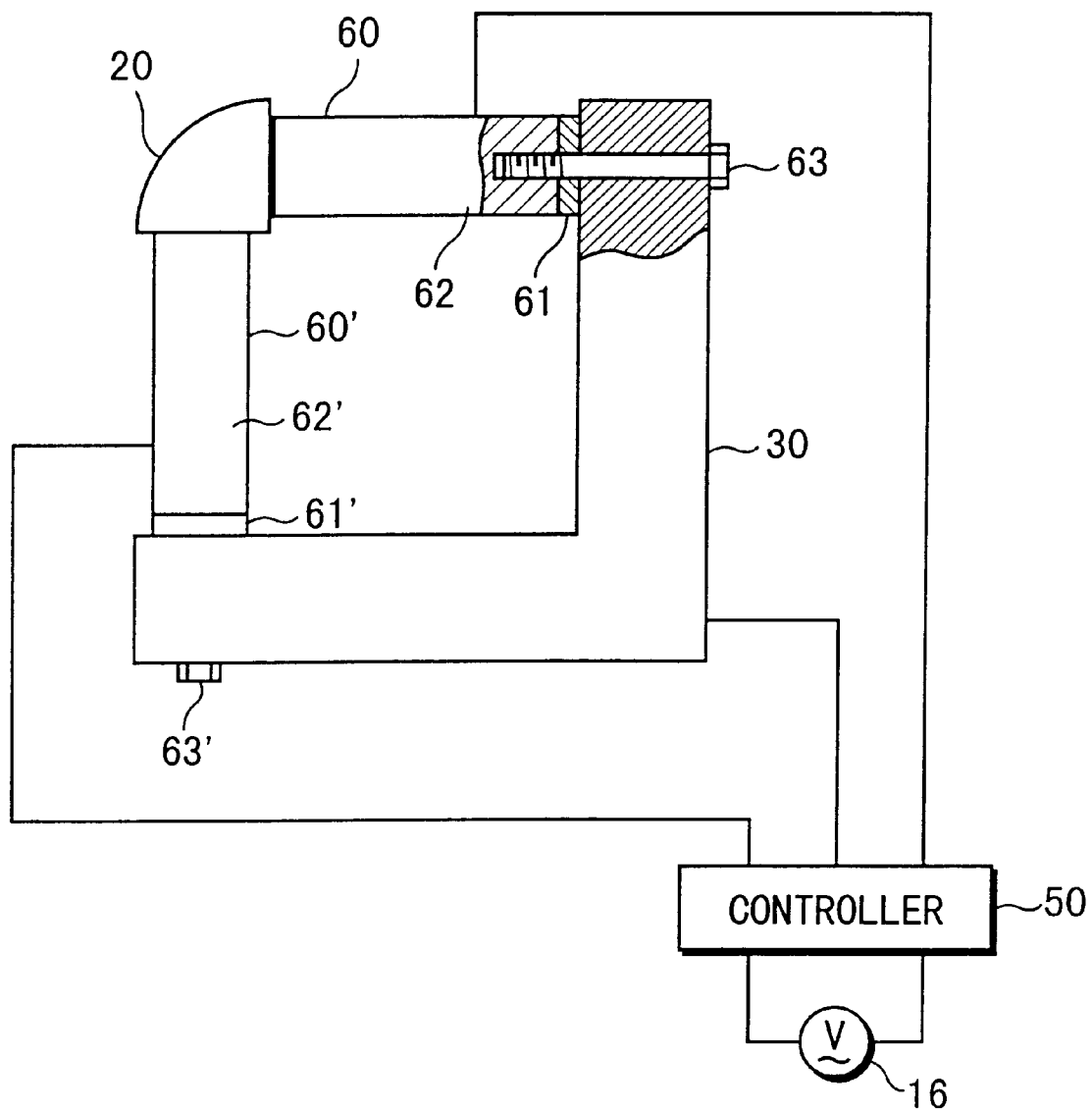
FIG. 21 is front view for showing a modified configuration of an actuator in this embodiment.

A configuration of the modified actuator is shown in FIG. 21. A first displacing device 60 and a second displacing device 60' are respectively configured by single layered piezoelectric devices (ceramic thin plates) 61 and 61', and elastic members 62 and 62'. No electrode is provided on both surface of the piezoelectric devices 61 and 61'. Base ends of the first displacing device 60 and the second displacing device 60' are respectively fixed on the base member by screws 63 and 63' without using any adhesive. On the other hand, the chip member 20 is fixed on top ends of the first displacing device 60 and the second displacing device 60' by an adhesive or screws. The elastic members 62 and 62' and the base member 30 are respectively formed by conductive materials. A driving power source 16 is connected between alternative of elastic members 61 and the base member 30 and the elastic member 62' and the base member 30 so as to drive the first displacing device 60 or the second displacing device 60' at the above-mentioned resonance frequencies.

When the elastic member 62 or 62' is vibrated at the resonance frequency by the piezoelectric device 61 or 61' using as an oscillator, the displacement of the first displacing device 60 or the second displacing device 60' can be enlarged. Furthermore, the tension acting on the piezoelectric devices 61 and 61' becomes smaller, so that the destruction of the piezoelectric device 61 and 61' can be prevented. As a material of the elastic member 62 and 62', aluminum, titanium, iron, copper, and an alloy including at least one of them can be used. Since the ratio of the piezoelectric devices 61 and 61' in the length of the displacing devices 60 and 60' is very small, the affect due to the piezoelectric devices 61 and 61' can be ignored when the above-mentioned normal vibration is calculated.

In the above-mentioned description of the embodiment, two displacing devices such as the first piezoelectric device 10 and the second piezoelectric device 10' or the first displacing device 60 and the second displacing device 60' are disposed for crossing at right angle. It, however, is not restricted by this disposition. It is possible to cross at another angle such as 45 degrees or 135 degrees. Furthermore, the number of the displacing devices are not restricted by two. It is possible to use more than three displacing devices for realizing a movement having three or four degrees of freedom. Still furthermore, it is possible to use another mechanical or electric displacing device such as a magnetostrictive device as a driving source.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An actuator comprising:
    a base member;
    a first displacing device held on the base member, said first displacing device being displaceable by electrical driving signals;
    a second displacing device held on the base member, said second displacing device being displaceable;
    a compound member connected to the first and second displacing devices; and
    a driver for driving the compound member along an elliptical or a circular trail by providing an electrical driving signal to only one of the first displacing device and the second displacing device, wherein only one of the first displacing device and the second displacing device is driven at any given time.

2. An actuator in accordance with claim 1, further comprising a pressing member for generating a pressure for pressing the compound member to an object to be driven.

3. An actuator comprising:
    a base member;
    a first displacing device held on the base member, said first displacing device being displaceable by electrical driving signals;
    a second displacing device held on the base member, said second displacing device being displaceable;
    a compound member connected to the first and second displacing devices; and
    a driver for supplying driving signals to the first displacing device in a manner so that the compound member moves along an elliptical or a circular trail,
    wherein a frequency f of the electrical driving signals is shown by the following equations:

$$f = \omega/2\pi$$
    $$\omega^2 = 2\omega_{n1}^2 \cdot \omega_{n2}^2 \cdot (1-2\xi^2)/(\omega_{n1}^2 + \omega_{n2}^2)$$

$\omega_{n1}$: a natural frequency of the first displacing device in a same phase mode
    $\omega_{n2}$: a natural frequency of the first displacing device in an opposite phase mode
    $\xi$: a damping ratio of the displacing device.

4. An actuator in accordance with claim 1, wherein the first displacing device includes an elastic member provided at a portion thereof.

5. An actuator in accordance with claim 4, wherein the second displacing device includes an elastic member provided at a portion thereof.

6. An actuator in accordance with claim 1, wherein the first displacing device includes a piezoelectric device as a driving source.

7. An actuator comprising:
    a base member;
    a first displacing device held on the base member, said first displacing device being displaceable by electrical driving signals;
    a second displacing device held on the base member, said second displacing device being displaceable;
    a compound member connected to the first and second displacing devices;
    a driver for supplying electric power to the first displacing device in a manner so that the compound member moves along an elliptical or a circular trail;
    a voltage sensor for sensing a voltage generated by the second displacing device when the second displacing device is vibrated by vibrations transmitted from the first displacing device; and
    a vibration sensor for sensing vibrating state of the first displacing device by using the voltage sensed by the voltage sensor.

8. An actuator in accordance with claim 7, wherein at least one of an amplitude and a frequency of driving signals applied to the first displacing device is controlled corresponding to the vibration state sensed by the vibration sensor.

9. An actuator comprising
    a base member;
    a first displacing device held on the base member, said first displacing device being displaceable by electrical driving signals;
    a second displacing device held on the base member, said second displacing device being displaceable by electrical driving signals;
    a compound member connected to the first and second displacing devices; and
    a driver for driving the compound member along an elliptical or a circular trail by supplying electric power to only one of the first displacing member and the second displacing member, wherein only one of the first displacing device and the second displacing device is driven at any given time.

10. An actuator in accordance with claim 9, further comprising a pressing member for generating a pressure for pressing the compound member to an object to be driven.

11. An actuator comprising:
a base member;
a first displacing device held on the base member, said first displacing device being displaceable by electrical driving signals;
a second displacing device held on the base member, said second displacing device being displaceable by electrical driving signals;
a compound member connected to the first and second displacing devices; and
a driver for supplying electrical driving signals to the first displacing device in a manner so that the compound member moves along an elliptical or a circular trail and supplying no electrical driving signals to the second displacing device while electrical driving signals are being supplied to the first displacing device,
wherein a frequency f of the electrical driving signals is shown by the following equations;

$$f = \omega/2\pi$$
$$\omega^2 = 2\omega_{n1}^2 \cdot \omega_{n2}^2 \cdot (1-2\zeta^2)/(\omega_{n1}^2 + \omega_{n2}^2)$$

$\omega_{n1}$: a natural frequency of the first displacing device in a same phase mode
$\omega_{n2}$: a natural frequency of the first displacing device in an opposite phase mode
$\zeta$: a damping ratio of the first displacing device.

12. An actuator in accordance with claim 9, wherein the first displacing device includes an elastic member provided at a portion thereof.

13. An actuator in accordance with claim 12, wherein the second displacing device includes an elastic member provided at a portion thereof.

14. An actuator in accordance with claim 9, wherein the first displacing device includes a piezoelectric device as a driving source.

15. An actuator comprising:
a base member;
a first displacing device held on the base member, said first displacing device being displaceable by electrical driving signals;
a second displacing device held on the base member, said second displacing device being displaceable by electrical driving signals;
a compound member connected to the first and second displacing devices;
a driver for supplying electrical driving signals to the first displacing device in a manner so that the compound member moves along an elliptical or a circular trail and supplying no electrical driving signals to the second displacing device while electrical driving signals are being supplied to the first displacing device;
a voltage sensor for sensing a voltage generated by the second displacing device when the second displacing device is vibrated by vibrations transmitted from the first displacing device; and
a vibration sensor for sensing vibrating state of the first displacing device by using the voltage sensed by the voltage sensor,
wherein the first displacing device includes a piezoelectric device as a driving source.

16. An actuator in accordance with claim 15, wherein at least one of an amplitude and a frequency of driving signals applied to the first displacing device is controlled corresponding to the vibration state sensed by the vibration sensor.

17. An actuator comprising:
a plurality of displacing devices for generating a displacement, each of said displacing devices having a compounding end and a base end;
a compound member connected to the compounding end of each of the displacing devices and for compounding displacements of the displacing devices;
a base member for folding the base ends of the displacing devices;
a pressing member for pressing the compound member to an object to be driven; and
a driver for driving the compound member along an elliptical or a circular trail by selectively supplying a driving signal to only a selected one of the plurality of displacing devices,
wherein vibrations of the selected displacing device are transmitted to a non-selected displacing device so as to vibrate the non-selected displacing device for moving the compound member along an elliptic or a circular trail, and
wherein only one of the plurality of displacing devices is driven at any given time.

18. An actuator in accordance with claim 17, wherein the selected displacing device is driven in a manner so that a trail of the compound member under a no-load condition is a circle and the trail is restricted to a semicircle when it is pressed to the object to be driven by the pressing member.

19. An actuator comprising:
a plurality of displacing devices for generating a displacement;
a compound member connected to the displacing devices and for compounding displacements of the displacing devices;
a base member for folding base ends of the displacing devices to which the compound member is not fixed;
a pressing member for pressing the compound member to an object to be driven; and
a driver selectively for driving a selected one of the plurality of displacing devices,
wherein vibrations of the selected displacing device are transmitted to a non-selected displacing device so as to vibrate the non-selected displacing device for moving the compound member along an elliptical or a circular trail, wherein the selected displacing device is driven by driving signals having a frequency $f_3 = (f_1 + f_2)/2$,
wherein the frequency $f_1$ is a resonance frequency of the selected displacing device in a same phase mode in which two displacing devices are expansively vibrated in the same phase,
wherein the frequency $f_2$ is a resonance frequency of the selected displacing device in an opposite phase mode in which two displacing devices are expansively vibrated in the opposite phase, and
wherein the frequency $f_3$ is a frequency for expansively vibrating two displacing devices with a phase difference of 90 degrees.

20. An actuator comprising:
a plurality of displacing devices for generating a displacement;

a compound member connected to the displacing devices and for compounding displacements of the displacing devices;

a base member for folding base ends of the displacing devices to which the compound member is not fixed;

a pressing member for pressing the compound member to an object to be driven; and a driver selectively for driving a selected one of the plurality of displacing devices, wherein vibrations of the selected displacing device are transmitted to a non-selected displacing device so as to vibrate the non-selected displacing device for moving the compound member along an elliptical or a circular trail, wherein the selected displacing device and the non-selected displacing device include a piezoelectric device, and wherein a vibration state of the selected displacing device is determined by sensing an output voltage of the piezoelectric device of the non-selected displacing device.

* * * * *